(12) United States Patent
Toutov et al.

(10) Patent No.: US 11,028,107 B2
(45) Date of Patent: Jun. 8, 2021

(54) STABLE SILYLATING REAGENTS

(71) Applicant: CALIFORNIA INSTITUTE OF TECHNOLOGY, Pasadena, CA (US)

(72) Inventors: Anton Toutov, Pasadena, CA (US); Wenbo Liu, Pasadena, CA (US); David P. Schuman, Pasadena, CA (US); Brian M. Stoltz, San Marino, CA (US); Robert H. Grubbs, South Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 19 days.

(21) Appl. No.: 15/438,929

(22) Filed: Feb. 22, 2017

(65) Prior Publication Data
US 2017/0240571 A1    Aug. 24, 2017

Related U.S. Application Data

(60) Provisional application No. 62/298,337, filed on Feb. 22, 2016, provisional application No. 62/361,929, filed on Jul. 13, 2016.

(51) Int. Cl.
    C07F 7/08    (2006.01)
    C07F 7/18    (2006.01)

(52) U.S. Cl.
    CPC .......... *C07F 7/0814* (2013.01); *C07F 7/0896* (2013.01); *C07F 7/1804* (2013.01)

(58) Field of Classification Search
    CPC .... C07F 7/0814; C07F 7/0896; C07F 7/1804; C07F 7/08; C07F 7/018
    See application file for complete search history.

(56) References Cited

U.S. PATENT DOCUMENTS

| | | | |
|---|---|---|---|
| 5,523,384 A | 6/1996 | Memeger et al. | |
| 9,000,167 B2 * | 4/2015 | Grubbs | C07F 7/0812 546/14 |
| 9,556,080 B2 | 1/2017 | Toutov et al. | |
| 9,556,206 B2 | 1/2017 | Toutov et al. | |
| 9,908,840 B2 * | 3/2018 | Grubbs | C07F 7/0814 |
| 2014/0091256 A1 * | 4/2014 | Grubbs | C07F 7/081 252/183.13 |
| 2015/0166579 A1 * | 6/2015 | Grubbs | C07F 7/0812 546/14 |
| 2016/0046653 A1 | 2/2016 | Toutov et al. | |
| 2016/0347776 A1 | 12/2016 | Toutov et al. | |
| 2017/0029447 A1 | 2/2017 | Toutov et al. | |

FOREIGN PATENT DOCUMENTS

| | | | |
|---|---|---|---|
| WO | WO 2014/055587 A1 | 4/2014 | |
| WO | WO-2014055587 A1 * | 4/2014 | ............ C07F 7/0812 |

OTHER PUBLICATIONS

Toutov et al. "Catalytic C-H bond silylation of aromatic heterocycles" Nat. Protoc. 2015, 10, 1897-1903. (Year: 2015).*
Becker et al. "A general route to five-coordinate hydridosilicates" J. Organomet. Chem. 1989, 359, C33-C35. (Year: 1989).*
Gillette et al. "Spectroscopic Observation of Sllylene-Ether Complexes" Organomet. 1987, 6, 2617-2618. (Year: 1987).*
Sanji et al. "Lewis Base Induced Reversal of Diastereoselectivity in the Addition of Alcohols to Chiral Silylenes" Organomet. 2006, 25, 6159-6161. (Year: 2006).*
Volkov et al. "Catalytic Reductive Dehydration of Tertiary Amides to Enamines under Hydrosilylation Conditions" Org. Lett. 2014, 16, 680-683. (Year: 2014).*
Becker et al., "A general route to five-coordinate hydridosilicates", Journal of Organometallic Chemistry, Jan. 1989, 359(2), C33-C35.
Boyer et al., "Reduction selective de composes carbonyls par catalyse heterogene a la surface des sels", Tetrahedron, 1981, 37, 2165-2171.
Cheng et al., "Iridium-Catalyzed, Diastereoselective Dehydrogenative Silylation Terminal Alkenes with (TMSO)$_2$MeSiH", Angewandte Chemie International Edition, 2013, 52, 8984-8989.
Chuit et al., "Reactivity of penta- and hexacoordinate silicon compounds and their role as reaction intermediates", Chemical Reviews, 1993, 93, 1371-1448.
Corriu et al., "Activation of silicon-hydrogen, silicon oxygen, silicon-nitrogen bonds in heterogeneous phase: Some new methods in organic synthesis", Tetrahedron, 1983, 39, 999-1009.
Corriu et al., "Pentacoordinate hydridosilicates: synthesis and some aspects of their reactivity", Organometallics, 1991, 10, 2297-2303.
Corriu et al., "Pentavalent hydridosilicates: Some aspects of the reactivity of potassium tetraethoxyhydridoscilicate",Journal of Organometallic Chemistry, 1989, 365, C7-C10.
Kanyiva et al., "Palladium-Catalyzed Direct C-H Silylation and Germanylation of Benzamides and Carboxamides", Organic Letters, 2014, 16, 1968-1971.
McAtee et al., "Preparation of Allyl and Vinyl Silanes by the Palladium-Catalyzed Silylation of Terminal Olefins: A Silyl-Heck Reaction", Angewandte Chemie International Edition, 2012, 51, 3663-3667.
Shippey et al., "Trimethylsilyl anions; Direct synthesis of trimethylsilylbenzenes", Journal of Organic Chemistry, 1977, vol. 42, No. 15, 2654-2655.
Corriu, Robert J. P., et al., "Pentacoordinate dihydriodosilicates: synthesis, structure, and aspects of their reactivity", Organometallics, 1991, 10(10), 3574-3581.

(Continued)

*Primary Examiner* — Amanda L. Aguirre
(74) *Attorney, Agent, or Firm* — BakerHostetler

(57) ABSTRACT

The present invention is directed to compositions for silylating organic substrates containing C—H or O—H bonds, especially heteroaromatic substrates. The compositions are derived from the preconditioning of mixtures of hydrosilanes or organodisilanes with bases, including metal hydroxide and metal alkoxide bases. In some embodiments, the preconditioning results in the formation of reactive silicon hydride species.

17 Claims, 11 Drawing Sheets

(56) References Cited

OTHER PUBLICATIONS

Harloff, J., et al., "Reactions of siloxysilanes with alkali metal trimethylsilanolates", Database CA (Online) Chemical Abstracts Service, Columbus, Ohio, Apr. 4, 1998.
Prince, Paul D., et al., "Hypervalent hydriodosilicates: synthesis, structure and hydride bridging", Dalton Transactions, 2008, (2), 271-282.
Database CA [Online] Chemical Abstracts Service, Columbus, Ohio, US; Harloff, J. et al: "Reactions of siloxysilanes with alkali metal trimethylsilanolates",XP002792997,retrieved from STN Database accession No. 2000:349769.

* cited by examiner

STABLE SILYLATING REAGENTS

CROSS REFERENCE TO RELATED APPLICATIONS

This application claims the benefit of priority to U.S. Patent Application Nos. 62/298,337, filed Feb. 22, 2016, and 62/361,929, filed Jul. 13, 2016, the contents of which are incorporated by reference herein for all purposes.

GOVERNMENT RIGHTS

This invention was made with government support under Grant No. CHE1212767 and Grant No. CHE1205646 awarded by the National Science Foundation. The government has certain rights in the invention.

TECHNICAL FIELD

This invention is directed to reagents for silylating organic substrates.

BACKGROUND

The ability to silylate organic moieties has attracted significant attention in recent years, owing to the utility of the silylated materials in their own rights and as intermediates for other important materials used, for example, in agrichemical, pharmaceutical, and electronic material applications.

Over the past several decades, considerable effort has been allocated to the development of powerful catalyst architectures to accomplish a variety of C—H functionalization reactions, revolutionizing the logic of chemical synthesis and consequently streamlining synthetic chemistry. Accomplishing such challenging transformations can often necessitate the use of stoichiometric additives, demanding reaction conditions, complex ligands, and most notably precious metal catalysts. The need to use precious metal catalysts for these transformations remains a fundamental and longstanding limitation.

Recently, systems involving the use of various hydroxides, alkoxides, and other bases have been reported for the silylation of heteroaromatic, alkynyl, alkenyl, and exocyclic C—H bonds and hydroxy O—H bonds using organosilanes (a.k.a. hydrosilanes) and organodisilanes. Not reported, however, is the varying induction times which are seen in these transformations. Nor has it ever been reported or suggested that stable, storable compositions derived from these bases and silanes can be prepared in advance of contacting the organic substrates and that these preconditioned solutions are also operable on these substrates.

The present invention takes advantage of the discoveries cited herein to avoid at least some of the problems associated with previously known methods.

SUMMARY

Herein disclosed are chemical compositions and methods employing these compositions which eliminate the previously unreported induction times. These compositions, which are stable/storable for up to 6 months or longer at low temperatures, are prepared by the preconditioning of mixtures comprising hydrosilanes / organodisilanes and various alkali metal hydroxides and alkoxides and other bases. Reaction of organic substrates, previously shown to be susceptible to silylation with these compositions, results in their immediate silylation, i.e., absent any induction periods. At least one of the many advantage of these compositions is the ability to prepare and store these silylating agents, without the need to mix and combine all of the ingredients in small batches, each time they are needed. The catalytic cross-dehydrogenative method avoids the limitations of previous strategies and successfully couples the appropriate substrates and hydrosilanes.

Various embodiments includes compositions prepared by or preparable by preconditioning a mixture of:

(a) a precursor hydrosilane or organodisilane; and (b) a base comprising or consisting essentially of potassium hydroxide, a potassium alkoxide, a potassium silanolate (e.g., KOTMS), rubidium hydroxide, a rubidium alkoxide, a rubidium silanolate, cesium hydroxide, a cesium alkoxide, a cesium silanolate, a potassium amide (e.g., potassium bis(trimethylsilyl) amide), a graphitic potassium (e.g., $KC_8$), or a combination thereof;

in the substantial absence of a heteroaromatic, olefinic, or acetylenic substrate capable of C—H silylation, the preconditioning comprising holding the mixture of the combined hydrosilane or organodisilane and the base for a time and temperature sufficient to produce the composition capable of initiating measurable silylation of 1-methyl indole (N-methylindole) at a temperature of 45° C. (or less) with an induction period of less than 30, 25, 20, 15, 10, 5, or 1 minutes. The presence or absence of an induction period may be determined using any of the methods described herein for this purpose, for example time-dependent gas chromatography (GC). One exemplary temperature range to produce such compositions include from about 25° C. to about 125° C. Higher or lower temperatures may also be employed. One exemplary temporal range to produce such compositions include from about 30 minutes to about 48 hours. Greater or less times may also be employed, and may be affected by the presence of trace amounts of oxygen or water. That is, while exemplary ranges, it should be appreciated that times and temperatures outside these exemplary ranges may also result in the formation of these compositions.

While the compositions are described in terms of their reactivity with respect to 1-methyl indole (N-methylindole) (also known as N-methyl indole or 1-methyl-1H-indole), the compositions are useful for silylating a range of other C—H bonds and —OH bonds. The use of 1-methyl indole (N-methylindole) is used simply as one standard gauge against which activity is to be measured. It is not meant to be seen as limiting the composition to applications of this substrate.

Further, these compositions are stable once prepared and may be stored for up to weeks or months without loss of activity. Exhaustive studies have been conducted to elucidate the specific nature of the stable ingredients of the preconditioned compositions and the mechanisms of their action. IR data support the existence of such a hypercoordinated silicon species formed, at least, by the hydrosilane and alkoxide, hydroxide or silanolate, and the postulated mechanisms involving such hypercoordinated silicon hydride anions explain all known observations made with respect to these silylating systems.

Other embodiments includes compositions comprising Si—H-based species derivable from a preconditioning reaction between:

(a) a precursor hydrosilane; and (b) a base comprising or consisting essentially of potassium hydroxide, a potassium alkoxide, a potassium silanolate (e.g., KOTMS), rubidium hydroxide, a rubidium alkoxide, a rubidium silanolate, cesium hydroxide, a cesium alkoxide, a cesium silanolate, a potassium amide (e.g., potassium bis(trimethylsilyl) amide, or a combination thereof; again in the substantial absence of a heteroaromatic, olefinic, or acetylenic substrate capable of C—H silylation; and wherein the precursor hydrosilane exhibits an absorption peak in the Si—H stretching region of infrared spectrum and the Si—H-based species exhibits an absorption peak in the Si—H stretching region of an infrared spectrum that is of lower energy than the absorption peak of the precursor hydrosilane, when evaluated under comparable conditions.

In some embodiments, Si—H-based species is present in sufficient amounts in the compositions to be characterized by the IR absorbance attributable to a Si—H stretching frequency, either in solution—e.g., using ReactIR—or as an isolable/isolated solid. While the relative intensities of these absorption peak attributable to the Si—H stretching depend on concentration of these Si—H-based species, and the various embodiments may be defined in terms of the concentrations of these species (including detectable vs. non-detectable). That is, in some embodiments, the Si—H-based species are present in the compositions at concentrations sufficient for the IR absorbance attributable to a Si—H stretching frequency to be present or observed using ReactIR methods.

In various embodiments, compositions are isolable or isolated solids. In other embodiments, the compositions consist of the precursor hydrosilane (or organodisilane) and an appropriate base (i.e., neat, or without extraneous solvent). In still other embodiments, the compositions are solutions comprising an added solvent—e.g., the reaction solvent used in the preconditioning. Preferably, the solvent is not measurably reactive with the Si—H-based species or to the silylation reaction over times corresponding to storage of use. These solvents may be hydrocarbon- or ether-based, preferably an oxygen donor containing solvent, preferably an ether-type solvent. Ether solvents, such as tetrahydrofurans (including 2-methyl-tetrahydrofuran), diethyl and dimethyl ether, methyl-t-butyl ether, dioxane, and alkyl terminated glycols, such as 1,2-dimethoxyethane, have been shown to work well. Polar aprotic solvents including HMPA are also believed to be acceptable. Optionally substituted tetrahydrofuran, for example THF or 2 Me-THF (2-methyl tetrahydrofuran) are especially preferred for this purpose.

In some cases, the compositions and methods can be derived from precursor hydrosilanes of the Formula (I) or Formula (II) or organosilanes of Formula (III):

$(R)_{3-m}Si(H)_{m+1}$ (I)

$(R)_{3-m}(H)_mSi—Si(R)_{2-m}(H)_{m-1}$ (II),

$(R')_3Si—Si(R')_3$ (III)

where m is independently 0, 1, or 2; and each R and R' are independently an optionally substituted alkyl, alkenyl, alkynyl, aryl, and/or heteroaryl moiety, the specifics of which are further described elsewhere. R' may also independently comprise optionally substituted alkoxy, aryloxy, or trimethylsiloxy moieties. In preferred embodiments, the at least one hydrosilane is $(R)_3SiH$ or $(R)_2SiH_2$, where R is independently at each occurrence $C_{1-6}$ alkyl, phenyl, tolyl, or pyridinyl. In some preferred embodiments, the organodisilane is hexamethyldisilane.

In certain preferred embodiments, the base comprises a potassium cation and a hydroxide or a $C_{1-6}$ alkoxide. Compositions comprising potassium tert-butoxide are especially preferred.

Some embodiments include a compound, or compositions, comprising the compound, having an optionally solvated silicon hydride structure of Formula (IV):

(IV)

wherein $M^+$ is or comprises a cation comprising potassium, rubidium, cesium, or a combination thereof;

—$OR^B$ is or comprises hydroxide, an alkoxide, an alkyl silanolate; or a combination thereof; and —$R^S$ is or comprises H, —R, or —$Si(R)_{3-m}H_m$, or a combination thereof where m is and R is as described elsewhere herein; or an isomer thereof.

Additional embodiments of the present invention involve the use of these compositions in silylating an organic substrate having an C—H bond or —OH bond, the method comprising contacting the organic substrate with a preconditioned mixture described elsewhere herein wherein the contacting results in the formation of a C—Si bond or O—Si bond in the position previously occupied by the C—H bond or —OH bond, respectively; and wherein the C—H bond of the organic substrate is:
(a) located on a heteroaromatic moiety;
(b) located on an alkyl, alkoxy, or alkylene moiety positioned alpha to an aryl or heteroaryl moiety;
(c) an alkynyl C—H bond; or
(d) a terminal olefinic C—H bond;

and wherein the preconditioned mixture is able to initiate [measurable] silylation of 1-methyl indole at a temperature of 45° C. (or less) with an induction period of less than 30, 25, 20, 15, 10, 5, or 1 minutes (each induction period representing an independent embodiment).

Still other embodiments include methods comprising silylating at least one organic substrate containing a C—H bond or —OH bond, the method comprising contacting the organic substrate with:
(a) a precursor hydrosilane; and
(b) a base comprising or consisting essentially of cesium hydroxide, rubidium hydroxide, $KC_8$, or a combination thereof;

wherein the C—H bond of the organic substrate is:
(a) located on a heteroaromatic moiety;
(b) located on an alkyl, alkoxy, or alkylene moiety positioned alpha to an aryl or heteroaryl moiety;
(c) an alkynyl C—H bond; or
(d) a terminal olefinic C—H bond; and wherein the contacting results in the formation of a C—Si bond in the position previously occupied by the C—H bond. These bases have not previously been recognized as competent for silylating these organic substrates.

In related embodiments, the precursor hydrosilane and the base comprising or consisting essentially of cesium hydroxide, rubidium hydroxide, $KC_8$, or a combination thereof are preconditioned, as described above, before contacting with the organic substrate.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings.

DETAILED DESCRIPTION OF ILLUSTRATIVE EMBODIMENTS

Figure 1:
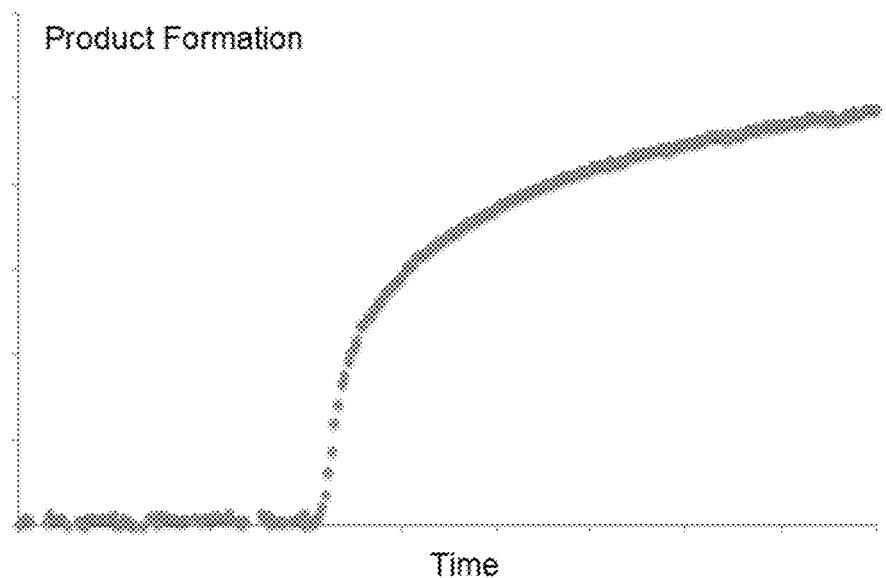
FIG. 1 illustrates a representative time course of the silylation of 1-methylindole (1), monitored by in situ $^1$H NMR.

The present invention is directed to stable silylation compositions and methods of using the same. The compositions do not require the presence of transition metal catalysts, and their ability to silylate heteroaryl and other unsaturated substrates does not require their presence or the presence of UV radiation or electrical (including plasma) discharges.

Methodology for the direct dehydrogenative C—H silylation of heteroaryl C—H bonds, acetylenic C—H bonds, and terminal olefinic C—H bonds have previously been reported, but these previous methods have been described only in terms of the simultaneous or near-simultaneous mixing of the ingredients before subjecting them to the reaction conditions. See, e.g., U.S. patent application Ser. Nos. 14/043,929, filed Oct. 2, 2013 (heteroaromatics with alkoxides), now U.S. Pat. No. 9,000,167; Ser. No. 14/818, 417, filed Aug. 5, 2015 (heteroaromatics with hydroxides); Ser. No. 14/841,964 filed Sep. 1, 2015 (alkynes), now U.S. Pat. No. 9,556,206; Ser. No. 14/972,653, filed Dec. 17, 2015 (disilanes), now U.S. Pat. No. 9,556,080; and Ser. No. 15/166,405 (terminal olefins), filed May 27, 2016, each of which is incorporated by reference herein in its entirety for all purposes, but especially for their methods of use, substrate range, and experimental conditions.

While these systems and methods described the use of hydrosilanes or organodisilanes and bases such as hydroxides, alkoxides, and anionic amides, their underlying mechanisms were undefined. In studies aimed at identifying the mechanistic bases for these reactions, the present inventors have identified a series of solution-stable compositions capable of silylating the same substrates as previously reported. These solution-stable compositions allow for the bulk preparation and storage of the silylating agents, avoiding the need to handle small quantities of reactive hydrosilanes on an individual batch basis, and thereby simplifying their use. These compositions may also incorporate highly volatile liquid or even gaseous hydrosilanes or organodisilanes into less volatile solvents, again simplifying handling of these silane reagents. Thirdly, the use of these preconditioned solutions also provides a reactivity that avoids the previously observed induction periods associated with the silylation reactions.

The present invention may be understood more readily by reference to the following description taken in connection with the accompanying Figures and Examples, all of which form a part of this disclosure. It is to be understood that this invention is not limited to the specific products, methods, conditions or parameters described or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to both the compositions and methods of making and using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using).

Silylating Compositions

Certain embodiments of the present invention include those compositions prepared by preconditioning a mixture of: (a) a precursor hydrosilane or organodisilane; and (b) a base comprising or consisting essentially of potassium hydroxide, a potassium alkoxide, a potassium silanolate (e.g., potassium trimethylsilanolate, KOTMS), rubidium hydroxide, a rubidium alkoxide, a rubidium silanolate, cesium hydroxide, a cesium alkoxide, a cesium silanolate, a potassium amide (e.g., potassium bis(trimethylsilyl) amide), a potassium graphite (e.g., $KC_8$), or a combination thereof; the preconditioning comprising holding the mixture of combined hydrosilane and the base under conditions sufficient to produce the composition capable of initiating measurable silylation of a suitable substrate on contacting the mixture and the substrate after at least 30 minutes of preconditioning the mixture. The preconditioning may also comprise holding the mixture of combined hydrosilane and the base under conditions sufficient to silylate 1-methyl indole at a temperature of 45° C. (or less) with an induction period of less than 30, 25, 20, 15, 10, 5, or 1 minutes. The presence or absence of an induction period may be determined using any of the methods described herein for this purpose, for example time-dependent gas chromatography (GC). One exemplary temperature range to produce such compositions include from about 25° C. to about 125° C. One exemplary temporal range to produce such compositions include from about 30 minutes to about 24 hours. While exemplary ranges, it should be appreciated that times and temperatures outside these exemplary ranges may also result in the formation of these compositions.

Given the effectiveness of graphitic potassium (e.g., $KC_8$) in these applications, it is also reasonable to expect that potassum deposited on other other surfaces (e.g., allotropes of carbons such as graphene, graphene oxide, charcoal, or activated carbon, alumina, or silica) are also operable, and considered within the scope of the present disclosure.

Again, while the compositions are described in terms of their reactivity with respect to 1-methyl indole (N-methyl indole), the compositions are useful for silylating a range of other C—H or —OH bond. The use of 1-methyl indole (N-methyl indole) is used simply as one standard gauge against which activity is to be measured. It is not meant to be seen as limiting the composition to applications of this substrate.

While other embodiments may describe these preconditioned compositions in terms of silicon hydrides, as described elsewhere herein, this preconditioning reaction may or may not result in the observable presence of a Si—H-based species. Rather, another measure of the presence of a persistent, stable silylation reaction is the ability of the material to silylate suitable substrates (i.e., previously shown to be susceptible to silylation when mixed simultaneously with the hydrosilane/base combinations, such as previously reported and described elsewhere herein), even after cold storage of the Si—H-based species in solution for periods of time in excess of 1 hour, 6 hours, 12 hours, 24 hours, a week, two weeks, a month, six months, up to a year or more. See FIGS. 1 and 2. At least in this regard, the term "stable" may be also refer to "storable." Even more interesting, these preconditioned compositions are capable of silylating suitable organic substrates, including heteroaromatic substrates, on immediate or practically immediate contact with these substrates, or shortly thereafter.

While not previously reported, but as described in the present Examples, silylations of heteroaromatic substrates using hydrosilanes and base catalysts in which the ingredients are simultaneously or near-simultaneously mixed, such as described in U.S. patent application Ser. No. 14/043,929, filed Oct. 2, 2013 (heteroaromatics with alkoxides), now U.S. Patent No. 9,000,167; Ser. No. 14/818,417, filed Aug. 5, 2015 (heteroaromatics with hydroxides); Ser. No. 14/841, 964 filed Sep. 1, 2015 (alkynes), now U.S. Pat. No. 9,556, 206; and Ser. No. 15/166,405 (terminal olefins), filed May 27, 2016, each of which is incorporated by reference herein, undergo the silylation reactions with a measurable induction period. This feature has not been previously reported. Yet, when the hydrosilanes and the bases are preconditioned as described herein, the preconditioned mixtures are stable and the reaction proceeds without any such induction period.

In other embodiments, the preconditioned compositions may be characterized or described in terms of Si—H-based species, as described herein. That is, certain other embodiments of the present invention include those compositions comprising a Si—H-based species derivable from the preconditioning reaction between: (a) a precursor hydrosilane; and (b) a base comprising or consisting essentially of potassium hydroxide, a potassium alkoxide, a potassium silanolate (e.g., KOTMS), rubidium hydroxide, a rubidium alkoxide, a rubidium silanolate, cesium hydroxide, a cesium alkoxide, a cesium silanolate, a potassium amide (e.g., potassium bis(trimethylsilyl) amide), or a combination thereof. In some aspects of these embodiments, the Si—H-based species derived or derivable from the preconditioning reaction may be identified by a characteristic shift of its infrared Si—H stretching frequency. That is, the precursor hydrosilane exhibits an absorption peak in the Si—H stretching region of infrared spectrum which depends on the nature of the precursor hydrosilane, and the Si—H-based species exhibits an absorption peak in the Si—H stretching region of an infrared spectrum that is of lower energy (lower wavenumbers) than the absorption peak of the precursor hydrosilane, when evaluated under comparable conditions. Such Si—H-based species can be present and detected in solution, or as solid compositions (see Examples).

In solution, the presence of the product/intermediate Si—H-based species can be and has been observed in solution using in situ Fourier Transform Infrared (FTIR) methods. For example, Mettler Toledo makes ReactIR equipment for just such analyses. Suitable for a wide range of chemistries, ReactIR provides real-time monitoring of key reaction species, and how these species change during the course of the reaction. Designed to follow reaction progression, ReactIR Attenuated Total Reflection (ATR) provides specific information about reaction initiation, conversion, intermediates and endpoint. As shown in the Examples, reactions of the exemplar silane Et₃SiH has been shown to react with the alkoxides and hydroxides cited herein to provide spectroscopically structures consistent with hypercoordinated silicon hydrides.

These Si—H-based species resulting from the preconditioning exhibit IR absorption shifts, depending on both the hydrosilanes and especially with the nature of the alkoxide or hydroxide bases, consistent with the relative reactivities of these hydrosilane/base pairs with organic substrates.

Figure 7A:
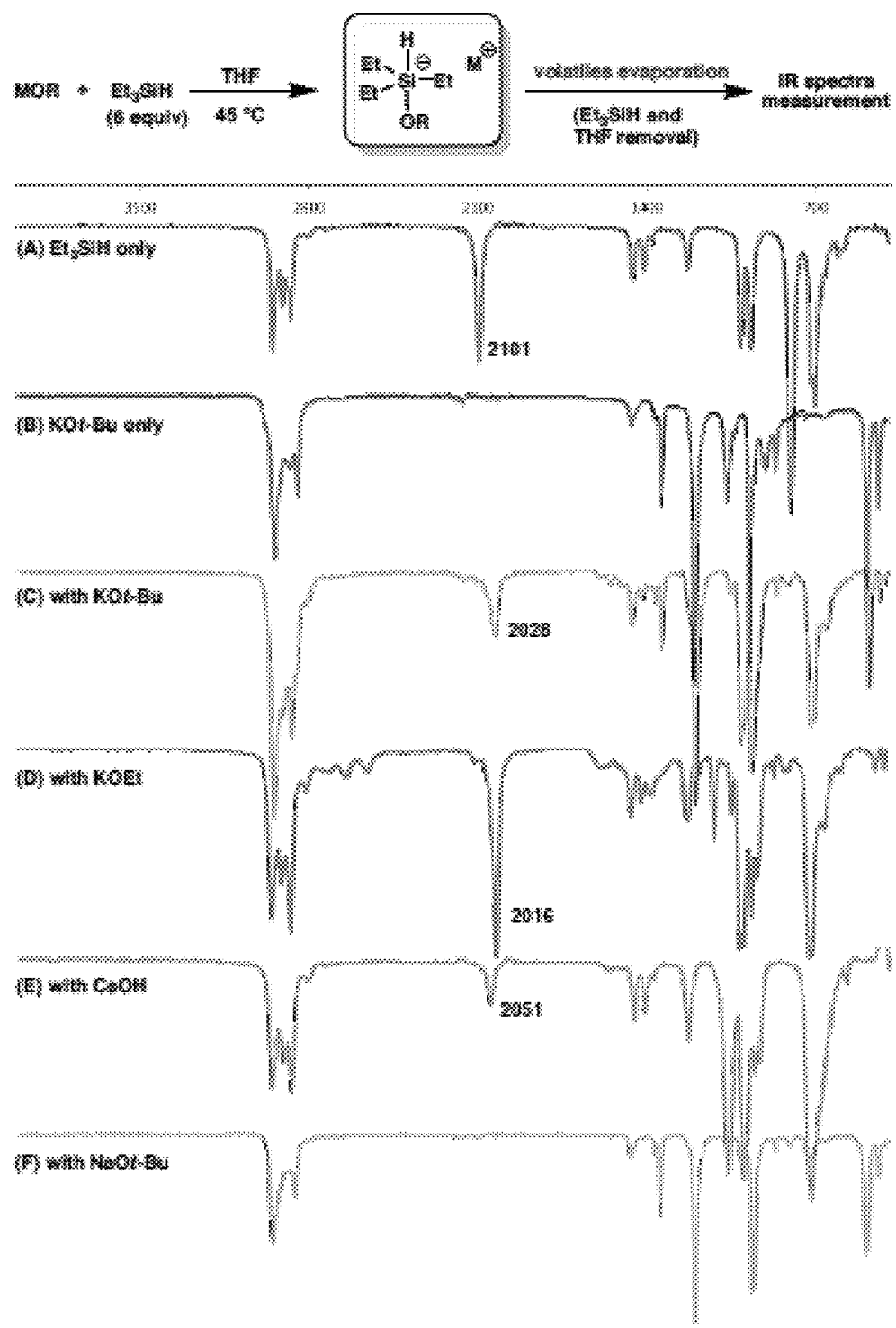
FIG. 7A illustrate the FTIR spectra of Si—H stretching region of select metal alkoxides with hydrosilane. Spectra were acquired under an atmosphere of N$_2$ and are normalized and stacked for clarity. (a) Neat Et$_3$SiH. (b) Neat KOt-Bu. (c), (d), (e), and (f) Prepared as indicated with MOR=KOt-Bu, KOEt, CsOH, and NaOt-Bu, respectively.
Figure 7B:
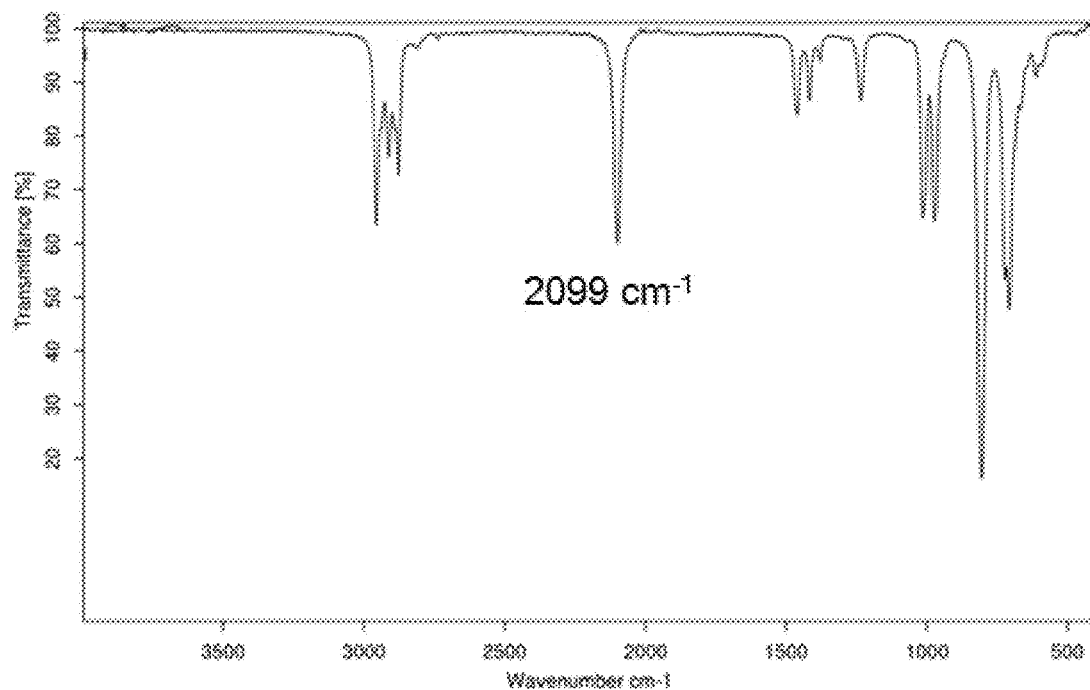
FIG. 7(B) is an IR spectrum of pure Et$_3$SiH.
Figure 7C:
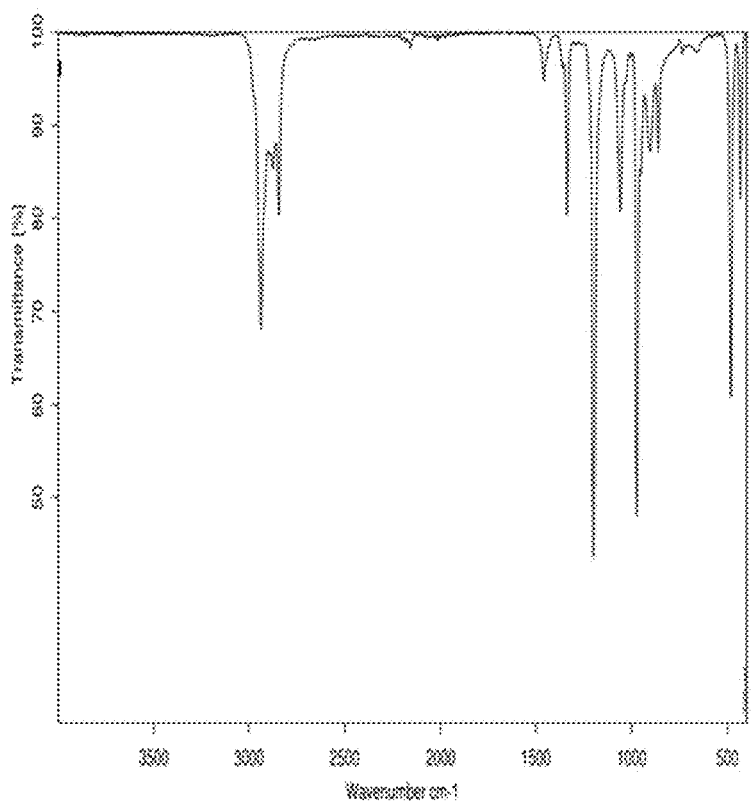
FIG. 7(C) is an IR spectrum of pure KOt-Bu.

It is noted here that, while consistent with such structures and the observation of such infrared absorptions correlate with silylation reactivities, the claims are not necessarily bound to the correctness or incorrectness of such an interpretation. Stated otherwise, these preconditioned compositions may be described or characterized as exhibiting an infrared absorbance peak in a range consistent with, but not necessarily attributable to, a Si—H stretching frequency; e.g., in a range of from about 2000 to 2100 cm⁻¹. And again, these absorbances are of lower energy (at lower wavenumbers) than the precursor silane. In some embodiments, the absorbance peaks may be shifted to lower wavenumbers in a range of from 10 to 100 cm-1, or as shown in FIG. 7A. It should be apparent to the skilled artisan, that compositions preconditioned with deuterosilanes do not exhibit absorbances in this range, but do exhibit the reactivities described above.

In various embodiments, the Si—H-based species are present in the preconditioned composition in amounts sufficient to detect this absorption peak attributed to the Si—H stretching region of an infrared spectrum.

In some embodiments, these preconditioned compositions exist as solutions. In other embodiments, they are present solvent-free or as isolated solids or semi-solids. In the former case, then, these preconditioned compositions may be described as comprising a solvent, typically an organic solvent, preferably an anhydrous solvent. Preferably such compositions are substantially free of other oxidizing species, including air, oxygen, or transition metal compounds or species. Also, the solvent is preferably not measurably reactive with the preconditioned compositions, including the Si—H-based species, or to the silylation reaction. Suitable solvents include hydrocarbons, such as aromatic hydrocarbons, for example benzene or toluene, Other suitable and preferred solvents include those comprising so-called oxygen donor solvents, preferably ether-type solvents. Tetrahydrofurans (including 2-methyl-tetrahydrofuran), diethyl and dimethyl ether, methyl-t-butyl ether, dioxane, and alkyl terminated glycols, such as 1,2-dimethoxyethane have been shown to work well. Other polar aprotic solvents including hexamethylphosphoramide (HMPA) are also believed to be acceptable. Tetrahydrofurans, including 2-methyl-tetrahydrofuran, are preferred.

As described above, in some embodiments, the base used in the precondition reaction comprises potassium hydroxide, rubidium hydroxide, cesium hydroxide, potassium alkoxide, a rubidium alkoxide, or a cesium alkoxide, or a mixture thereof. Other bases, such as those described elsewhere herein may also be used. Suitable alkoxides include $C_{1-6}$ alkoxides, such as methoxide, ethoxide, n-propoxide, iso-propoxide, n-butoxide, sec-butoxide, tert-butoxide, n-pentoxide, 2-pentoxide 3-pentoxide, or iso-pentoxide, preferably tert-butyl butoxide. Of the bases tested thus far, potassium alkoxide, and especially potassium tent-butoxide is preferred.

Suitable silanolates include those structures of formulae $(C_{1-6}$ alkyl$)_3$Si—O—, where the $C_{1-6}$ alkyls are independently placed. KOTMS, potassium trimethylsilanolate, is an attractive silanolate in this application.

In some embodiments, the precursor hydrosilane used in the preconditioned composition is of the Formula (I) or Formula (II):

$$(R)_{3-m}Si(H)_{m+1} \tag{I}$$

$$(R)_{3-m}(H)_mSi-Si(R)_{2-m}(H)_{m+1} \tag{II}$$

where: m is independently 0, 1, or 2; and each R is independently optionally substituted $C_{1-24}$ alkyl or heteroalkyl, optionally substituted $C_{2-24}$ alkenyl, optionally substituted $C_{2-24}$ alkynyl, optionally substituted $C_{6-12}$ aryl, $C_{3-12}$ heteroaryl, optionally substituted $C_{7-13}$ alkaryl, optionally substituted $C_{4-12}$ heteroalkaryl, optionally substituted $C_{7-13}$ aralkyl, or optionally substituted $C_{4-12}$ heteroaralkyl, and, if substituted, the substituents may be phosphonato, phosphoryl, phosphonyl, phosphino, sulfonato, $C_1$-$C_{20}$ alkylsulfanyl, $C_5$-$C_{20}$ arylsulfanyl, $C_1$-$C_{20}$ alkylsulfonyl, $C_5$-$C_{20}$ arylsulfonyl, $C_{20}$ alkylsulfinyl, 5 to 12 ring-membered arylsulfinyl, sulfonamido, amino, amido, imino, nitro, nitroso, hydroxyl, $C_1$-$C_{20}$ alkoxy, $C_5$-$C_{20}$ aryloxy, $C_2$-$C_{20}$ alkoxycarbonyl, $C_5$-$C_{20}$ aryloxycarbonyl, carboxyl, carboxylato, mercapto, formyl, $C_1$-$C_{20}$ thioester, cyano, cyanato, thiocyanato, isocyanate, thioisocyanate, carbamoyl, epoxy, styrenyl, silyl, silyloxy, silanyl, siloxazanyl, boronato, boryl, or halogen, or a metal-containing or metalloid-containing group, where the metalloid is Sn or Ge, where the substituents may optionally provide a tether to an insoluble or sparingly soluble support media comprising alumina, silica, or carbon.

In certain preferred embodiments, the precursor hydrosilane used in the preconditioned composition is or comprises a compound of formula $(R)_3SiH$ or $(R)_2SiH_2$, where R is independently at each occurrence $C_{1-6}$ alkyl, phenyl, tolyl, or pyridinyl. Exemplary precursor hydrosilane include those were R is independently at each occurrence methyl, ethyl, propyl, butyl, propyl, phenyl, biphenyl, benzyl, or pyridinyl, or substituted derivatives thereof.

In some embodiments, the precursor organodisilane used in the preconditioned composition is of the Formula (III):

$$(R')_3Si-Si(R')_3 \tag{III},$$

where R' is described above. R' may additionally independently comprise an optionally substituted $C_{1-24}$ alkoxy, an optionally substituted $C_{6-12}$ aryloxy, optionally substituted $C_{3-12}$ heteroaryloxy, optionally substituted $C_{7-13}$ alkaryloxy, optionally substituted $C_{4-12}$ heteroalkaryloxy, optionally substituted $C_{6-12}$ aralkoxy, $C_{4-12}$ heteroaralkoxy or a trimethylsiloxy moiety. In preferred embodiments, R' is independently $C_{1-3}$ alkyl or aryl; in other preferred embodiments, the organodisilane is hexamethyldisilane, tetramethyldiphenyldisilane, hexaethoxydisilane, or hexamethoxydisilane.

Accordingly, certain embodiments of the present invention include a compound having an optionally solvated silicon hydride structure of Formula (IV):

wherein

M$^+$ is or comprises a cation comprising potassium, rubidium, cesium, or a combination thereof;

—OR$^B$ is or comprises hydroxide, an alkoxide, an alkyl silanolate; or a combination thereof; and —R$^S$ is or comprises H, —R, or —Si(R)$_{3-m}$H$_m$, or a combination thereof where m is and R is as described elsewhere herein; or an isomer thereof.

Alternatively stated, this compound may be described or characterized as the addition product of (a) potassium hydroxide, a potassium alkoxide, a potassium silanolate, rubidium hydroxide, a rubidium alkoxide, a rubidium silanolate, cesium hydroxide, a cesium alkoxide, a cesium silanolate, or a combination thereof with (b) a precursor hydrosilane of Formula (I) or (II), or any of the individual precursor hydrosilanes as described elsewhere herein.

The structure of Formula (IV) is analogous to structures previously observed in other systems, though the present structures exhibit dramatically different and totally unexpected activity. For example, the addition of strong silicophilic Lewis bases (e.g. fluoride, alkoxide) are known to be able to increase the reactivity of hydrosilanes in the hydrosilylation of C=O bonds. It has been speculated that strongly reducing hypercoordinate silicate complexes are formed by coordination of nucleophilic anions during such processes, which typically weakens the Si—H bond and increases the hydridic character of this bond. Studies by Corriu et al. revealed that the direct reaction of (RO)$_3$SiH with the corresponding KOR (R=alkyl or aryl) in THF at room temperature affords the anionic, five-coordinate hydridosilicate [HSi(OR)$_4$]K in good yield. See, e.g., Becker, B., et al., *J. Organometallic Chem.*, 359 (2), January 1989, pp. C33-C35; Corriu, R., et al., J. C. *Chem. Rev.* 1993, 93, 1371-1448; Corriu, R. J., et al., *Tetrahedron* 1983, 39, 999-1009; Boyer, J.; et al., *Tetrahedron* 1981, 37, 2165-2171; Corriu, R., et al., *Organometallics* 2002, 10, 2297-2303; and Corriu, R., et al., Wang, Q. *J. Organomet. Chem.* 1989, 365, C7-C10.

As is described elsewhere herein, the compounds having an optionally solvated structure of Formula (IV) have been characterized spectroscopically and by their reactivity (in terms of substrate and regioselectivity) and kinetic profiles. The Si—H bond of the compound having an optionally solvated structure of Formula (IV) appears exhibit Brnsted-Lowry basicity. Silicon is less electronegative than hydrogen, and the Si—H bond in (IV) possesses some hydridic character. Upon nucleophilic (tBuO—) attack, the Si—H bond in the hypercoordinated silicon intermediate (IV) can, in some circumstances, serve as a hydride donor. Indeed, cleavage of the Si—H bond in hydrosilanes by strong nucleophiles to form alkylated or arylated silanes with loss of hydride is precedented in the literature. Therefore, the silane hydrogen in (IV) is expected to be sufficiently basic to abstract a proton from heteroaromatic substrates leading to formation of H$_2$. This proposition is further supported by an isotope labelling experiment: when C2-deuterated 1-methyl indole substrate was used as a substrate, the evolution of HD gas was observed.

Likewise, when different alkoxide bases were used as catalysts in stoichiometric reactions, the reaction efficiencies followed roughly the basicities (i.e., KOtBu>KOEt>KOMe). (alkoxide application). This behavior is consistent with the proposed addition of the alkoxide anion to the silane precursor silane to form the reactive hypercoordinated silicon intermediate.

The nature of the cation has previously been described— i.e., the silylations, at least of heteroarenes, fail to operate with sodium or lithium cations by themselves or when the added potassium ions are sequestered (for example, by crown ethers), but operate with facility when potassium, rubidium, or cesium are used. Interestingly, the silylation of alkynes or alcohols operate when the bases comprise sodium cations, and, while hydrides comprising these cations have not been observed, the stable preconditioned mixtures may be derived from such bases. Clearly, the cations play a non-innocent role in the activity of these reagents. Without intending to be bound by the correctness of any particular theory, perhaps this role involves either the (de)stabilization of the catalytic intermediate or the activation the substrate. As such, where the bases are characterized herein as comprising potassium, rubidium, or cesium hydroxides, alkoxides, or silanolates are to be used in the absence of crown ethers or other cation sequestering agents. Further, these bases can also be described as including sources of these unsequestered cations (K$^+$, Cs$^+$, Rb$^+$) with sources the operative hydroxide, alkoxide, or silanolate anions. For example, the use LiOH, NaOH, or alkaline earth metal hydroxides in the presence of added potassium salts, such as potassium chloride, nitrate, sulfate, or of a potassium salt comprising another similar non-reactive anion, may be considered a functional equivalent to KOH itself.

Under certain conditions, the preconditioned compositions exhibit character consistent with the homolytic scission of the Si—H bond, and the corresponding formation of a radical species. This may suggest the potential utility of these compounds or compositions as one-electron reductants, for example of transition metal complexes such as those comprising iron or cobalt.

Methods of Use

To this point, the invention has been describe in terms of compositions, but it should be appreciated that the compositions are also useful in silylation methods, and certain embodiments are directed toward their use in this capacity.

Some embodiments of the present invention include those where the preconditioned compositions, and/or the compositions of Formula (IV) are contacted with an organic substrate having an appropriate C—H bond or an O—H bond to silylate that carbon or oxygen. For example, some embodiments include method comprising contacting the organic substrate with any of the preconditioned mixtures described herein, wherein the contacting results in the formation of a C—Si bond in the position previously occupied by the C—H bond or in the formation of a O—Si bond in the position previously occupied by the O—H bond;

wherein the C—H bond of the unsaturated substrate is:

(a) located on a heteroaromatic moiety;

(b) located on an alkyl, alkoxy, or alkylene moiety positioned alpha to an aryl or heteroaryl moiety;

(c) an alkynyl C—H bond; or (d) a terminal olefinic C—H bond.

Each of the permutations of preconditioning conditions, bases, hydrosilanes, and substrates is deemed an independent embodiment of this disclosure as if each had been individually cited. In specific independent embodiments, the preconditioned mixtures and organic substrates are placed into contact for times of at least 30 minutes, 1 hour, 4 hours, 8 hours, 12 hours, 24 hours, 2 days, 4 days, 7 days, 14 days, or 28 days after the preconditioning reaction is done. Typically, especially for the extended periods, the preconditioned mixtures are refrigerated to favor the stability. Contacting the preconditioning conditions, bases, hydrosilanes, and substrates generally includes holding the resulting mixtures at one or more temperatures in a range of from about 25° C. to about 75° C. for a time in a range of from about 1 hour to about 48 hours, or as described in the various applications cited herein with respect to the specific organic substrates.

It is further recognized that the use of cesium hydroxide, rubidium hydroxide, or $KC_8$ has not been previously recognized or disclosed as a competent base for silylation reactions in combinations with hydrosilanes and, at least, heteroaromatic substrates. As such, methods describing their use in this capacity are considered independent embodiments of this disclosure. Certain embodiments, then, include those methods silylating at least one organic substrate containing a C—H bond or —OH bond, the method comprising contacting the organic substrate with:

(a) a precursor hydrosilane; and (b) a base comprising or consisting essentially of cesium hydroxide, rubidium hydroxide, $KC_8$, or a combination thereof;

wherein the C—H bond of the unsaturated substrate is:

(a) located on a heteroaromatic moiety;

(b) located on an alkyl, alkoxy, or alkylene moiety positioned alpha to an aryl or heteroaryl moiety;

(c) an alkynyl C—H bond; or (d) a terminal olefinic C—H bond; and wherein the contacting results in the formation of a C—Si bond in the position previously occupied by the C—H bond.

Still further embodiments include those methods wherein the precursor hydrosilane and the base are preconditioned before contacting with the organic substrate, the preconditioning comprising holding a mixture comprising the precursor hydrosilane and the base under conditions sufficient to produce the composition capable of initiating measurable silylation of a suitable substrate on contacting the mixture and the substrate after at least 30 minutes of preconditioning the mixture. The preconditioning may also comprise holding the mixture of combined hydrosilane and the base under conditions sufficient to initiate measurable silylation of 1-methyl indole at a temperature of 45° C. (or less) with an induction period of less than 30, 25, 20, 15, 10, 5, or 1 minutes.

Substrates Susceptible to Silylations

Previous applications by some of the same inventors have described the use of base and hydrosilanes to silylate organic substrates having C—H bonds or —OH bonds, wherein the silylation is defined in terms of replacing a C—H bond with C—Si bond or an O—H bond with an O—Si bond. See, for example, U.S. patent application Ser. No. 14/043,929, filed Oct. 2, 2013 (heteroaromatics with alkoxides), now U.S. Pat. No. 9,000,167; Ser. No. 14/818,417, filed Aug. 5, 2015 (heteroaromatics with hydroxides); Ser. No. 14/841,964 filed Sep. 1, 2015 (alkynes), now U.S. Pat. No. 9,556,206; Ser. No. 15/166,405 (terminal olefins), filed May 27, 2016; and Ser. No. 15/219,710, filed Jul. 26, 2016 (alcohols with hydroxides), each of which is incorporated by reference, at least for their teaching of methods and reaction conditions, including substrates and reactants relating to silylating their respective substrates.

The methods described herein are appropriately applied to any of the substrates described in these Patent Applications, including those wherein the organic substrate is or comprises:

(1) a heteroaromatic moiety, for example comprising an optionally substituted furan, pyrrole, thiophene, pyrazole, imidazole, triazole, isoxazole, oxazole, thiazole, isothiazole, oxadiazole, pyridine, pyridazine, pyrimidine, pyrazine, triazone, benzofuran, benzothiophene, isobenzofuran, isobenzothiophene, indole, isoindole, indolizine, indazole, azaindole, benzisoxazole, benzoxazole, quinoline, isoquinoline, cinnoline, quinazoline, naphthyridine, 2,3-dihydrobenzofuran, 2,3-dihydrobenzopyrrole, 2,3-dihydrobenzothiophene, dibenzofuran, xanthene, dibenzopyrol, or dibenzothiophene moiety. More specific example of these substrates are described in U.S. patent application Ser. No. 14/043,929, filed Oct. 2, 2013 (heteroaromatics with alkoxides), now U.S. Pat. No. 9,000,167 or Ser. No. 14/818,417, filed Aug. 5, 2015 (heteroaromatics with hydroxides), each of which is incorporated by reference herein at least for these teachings.

(2) a substrate comprising an alkyl, alkoxy, or alkylene moiety positioned alpha to an aryl or heteroaryl moiety, for example a benzylic C—H bond or a C—H bond which exists alpha to a heteroaryl group, such as 1,2 dimethylindole or 2,5-dimethylthiophene, or an exocyclic methoxy group. More specific example of these substrates are described in U.S. patent application Ser. No. 14/043,929, filed Oct. 2, 2013 (heteroaromatics with alkoxides), now U.S. Pat. No. 9,000,167 or Ser. No. 14/818,417, filed Aug. 5, 2015 (heteroaromatics with hydroxides).

(3) an alkynyl C—H bond having a formula:

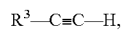

$R^3$—C≡C—H, where $R^3$ comprises an optionally substituted $C_{1-18}$ alkyl, optionally substituted $C_{2-18}$ alkenyl, optionally substituted $C_{2-18}$ alkynyl, optionally substituted $C_{6-18}$ aryl, optionally substituted $C_{6-18}$ aryloxy, optionally substituted $C_{7-18}$ aralkyl, optionally substituted $C_{7-18}$ aralkyloxy, optionally substituted $C_{3-18}$ heteroaryl, optionally substituted $C_{3-18}$ heteroaryloxy, optionally substituted $C_{4-18}$ heteroarylalkyl, optionally substituted $C_{4-18}$ heteroaralkyloxy, or optionally substituted metallocene. More specific example of these substrates are described in U.S. patent application Ser. No. 14/841,964 filed Sep. 1, 2015 (alkynes), now U.S. Pat. No. 9,556,206, which is incorporated by reference herein at least for these teachings.

(4) a terminal olefin has a Formula (V):

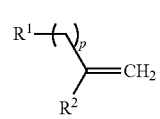

(V)

where p is 0 or 1; $R^1$ and $R^2$ independently comprises H, an optionally substituted $C_{1-18}$ alkyl, optionally substituted $C_{2-18}$ alkenyl, optionally substituted $C_{2-18}$ alkynyl, optionally substituted $C_{6-18}$ aryl, optionally substituted $C_{1-18}$ heteroalkyl, optionally substituted 5-6 ring membered heteroaryl, optionally substituted 5-6 ring membered aralkyl, optionally substituted 5-6 ring membered heteroaralkyl, or optionally substituted metallocene, provided that $R^1$ and $R^2$ are not both H. More specific example of these substrates are described in U.S. patent application Ser. No. 15/166,405 (terminal olefins), filed May 27, 2016, which is incorporated by reference herein at least for these teachings.

(5) an organic alcohol, having a structure of Formula (VIA) or (VIB).

$R^4$—OH (VIA)

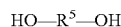

HO—$R^5$—OH (VIB), where $R^4$ comprises an optionally substituted $C_{1-24}$ alkyl, optionally substituted $C_{2-24}$ alkenyl, optionally substituted $C_{2-24}$ alkynyl, optionally substituted $C_{6-24}$ aryl, optionally substituted $C_{1-24}$ heteroalkyl, optionally substituted 5-or 6-ring membered heteroaryl, optionally substituted $C_{7-24}$ aralkyl, optionally substituted heteroaralkyl, or optionally substituted metallocene; and where $R^5$ comprises an optionally substituted $C_{2-12}$ alkylene, optionally substituted $C_{2-12}$ alkenylene, optionally substituted $C_{6-24}$ arylene, optionally substituted $C_{1-12}$ heteroalkylene, or an optionally substituted 5- or 6-ring membered heteroarylene. In some Aspect of this Embodiments, the organic substrate having at least one organic alcohol moiety is or comprises an optionally substituted catechol moiety or has a Formula (IV):

(IV)

wherein n is from 0 to 6, preferably 0 or 1;

$R^M$ and $R^N$ are independently H or methyl $R^D$, $R^E$, $R^F$, and $R^G$ are independently H, $C_{1-6}$ alkyl, $C_{1-6}$ alkenyl, optionally substituted phenyl, optionally substituted benzyl, or an optionally substituted 5-or 6-ring membered heteroaryl, wherein the optional substituents are $C_{1-3}$ alkyl, $C_{1-3}$ alkoxy, or halo. Within this genus, the organic substrate includes substituted 1,2-diols, 1,3-diols, 1,4-diols, these being substituted with one or more alkyl and/or optionally substituted aryl or heteroaryl substituents. The organic substrate is any one having a terminal olefin as described in U.S. patent application Ser. No. 15/219,710 (alcohols), filed Jul. 26, 2016, which is incorporated by reference herein at least for these teachings.

As shown in the Examples, the present compositions / compounds also appear to be suitable reagents for the deprotection / cleavage of amide groups or other acyl protected functional groups (e.g., esters). While Example 2.7 shows the exemplary deprotection of N-benzoylindole, other carbonyl protected amines or alcohols, for example by acetyl (Ac) as well as benzoyl (Bz) functional groups may be expected to react similarly.

Terms

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps and those that do not materially affect the basic and novel characteristic(s) of the claimed invention. Embodiments described in terms of the phrase "comprising" (or its equivalents), also provide, as embodiments, those which are independently described in terms of "consisting of" and "consisting essentially of" For those embodiments provided in terms of "consisting essentially of," the basic and novel characteristic(s) is the facile operability of the methods to provide silylated products at meaningful yields (or the ability of the systems used in such methods to provide the product compositions at meaningful yields or the compositions derived therefrom) using only those active ingredients listed. In those embodiments that provide a composition consisting essentially of hydrosilane or organodisilane and strong base, the term refers to the fact that this composition is present in the absence of silylatable aromatic, olefinic, or acetylenic substrates.

The term "meaningful product yields" is intended to reflect product yields of greater than 20%, but when specified, this term may also refer to yields of 10%, 20%, 30%, 40%, 50%, 60%, 70%, 80%, or 90% or more, relative to the amount of original substrate.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C." Similarly, a designation such as $C_{1-3}$ includes not only $C_{1-3}$, but also $C_1$, $C_2$, $C_3$, $C_{1-2}$, $C_{2-3}$, and $C_{1,3}$, as separate embodiments.

Throughout this specification, words are to be afforded their normal meaning, as would be understood by those skilled in the relevant art. However, so as to avoid misunderstanding, the meanings of certain terms will be specifically defined or clarified.

The term "alkyl" as used herein refers to a linear, branched, or cyclic saturated hydrocarbon group typically although not necessarily containing 1 to about 24 carbon atoms, preferably 1 to about 12 carbon atoms, such as methyl, ethyl, n-propyl, isopropyl, n-butyl, sec-butyl, isobutyl, tent-butyl, octyl, decyl, and the like, as well as cycloalkyl groups such as cyclopentyl, cyclohexyl and the like. Generally, although again not necessarily, alkyl groups herein contain 1 to about 12 carbon atoms. The term also includes "lower alkyl" as separate embodiments, which refers to an alkyl group of 1 to 6 carbon atoms, and the specific term "cycloalkyl" intends a cyclic alkyl group, typically having 4 to 8, preferably 5 to 7, carbon atoms. The term "substituted alkyl" refers to alkyl groups substituted with one or more substituent groups, and the terms "heteroatom-containing alkyl" and "heteroalkyl" refer to alkyl groups in which at least one carbon atom is replaced with a heteroatom. If not otherwise indicated, the terms "alkyl" and "lower alkyl" include linear, branched, cyclic, unsubstituted, substituted, and/or heteroatom-containing alkyl and lower alkyl groups, respectively.

The term "alkylene" as used herein refers to a difunctional linear, branched, or cyclic alkyl group, where "alkyl" is as defined above.

The term "alkenyl" as used herein refers to a linear, branched, or cyclic hydrocarbon group of 2 to about 24 carbon atoms containing at least one double bond, such as ethenyl, n-propenyl, isopropenyl, n-butenyl, isobutenyl, octenyl, decenyl, tetradecenyl, hexadecenyl, eicosenyl, tetracosenyl, and the like. Preferred alkenyl groups herein contain 2 to about 12 carbon atoms. The term also includes "lower alkenyl" as separate embodiments, which refers to an alkenyl group of 2 to 6 carbon atoms, and the specific term "cycloalkenyl" intends a cyclic alkenyl group, preferably having 5 to 8 carbon atoms. The term "substituted alkenyl" refers to alkenyl groups substituted with one or more substituent groups, and the terms "heteroatom-containing alkenyl" and "heteroalkenyl" refer to alkenyl groups in which at least one carbon atom is replaced with a heteroatom. If not otherwise indicated, the terms "alkenyl" and "lower alkenyl" include linear, branched, cyclic, unsubstituted, substituted, and/or heteroatom-containing alkenyl and lower alkenyl groups, respectively.

The term "alkenylene" as used herein refers to a difunctional linear, branched, or cyclic alkenyl group, where "alkenyl" is as defined above.

The term "alkynyl" as used herein refers to a linear or branched hydrocarbon group of 2 to about 24 carbon atoms containing at least one triple bond, such as ethynyl, n-propynyl, and the like. Preferred alkynyl groups herein contain 2 to about 12 carbon atoms. The term "lower alkynyl" intends an alkynyl group of 2 to 6 carbon atoms. The term also includes "lower alkynyl" as separate embodiments, which refers to an alkynyl group substituted with one or more substituent groups, and the terms "heteroatom-containing alkynyl" and "heteroalkynyl" refer to alkynyl in which at least one carbon atom is replaced with a heteroatom. If not otherwise indicated, the terms "alkynyl" and "lower alkynyl" include a linear, branched, unsubstituted, substituted, and/or heteroatom-containing alkynyl and lower alkynyl group, respectively.

The term "alkoxy" as used herein intends an alkyl group bound through a single, terminal ether linkage; that is, an "alkoxy" group may be represented as —O-alkyl where alkyl is as defined above. The term also includes "lower alkoxy" as separate embodiments, which refers to an alkoxy group containing 1 to 6 carbon atoms. Analogously, "alkenyloxy" and "lower alkenyloxy" respectively refer to an alkenyl and lower alkenyl group bound through a single, terminal ether linkage, and "alkynyloxy" and "lower alkynyloxy" respectively refer to an alkynyl and lower alkynyl group bound through a single, terminal ether linkage.

The term "aromatic" refers to the ring moieties which satisfy the Hückel 4n+2 rule for aromaticity, and includes both aryl (i.e., carbocyclic) and heteroaryl (also called heteroaromatic) structures, including aryl, aralkyl, alkaryl, heteroaryl, heteroaralkyl, or alk-heteroaryl moieties, or prepolymeric (e.g., monomeric, dimeric), oligomeric or polymeric analogs thereof.

The term "aryl" as used herein, and unless otherwise specified, refers to a carbocyclic aromatic substituent or structure containing a single aromatic ring or multiple aromatic rings that are fused together, directly linked, or indirectly linked (such that the different aromatic rings are bound to a common group such as a methylene or ethylene moiety). Preferred aryl groups contain 6 to 24 carbon atoms, and particularly preferred aryl groups contain 6 to 14 carbon atoms. Exemplary aryl groups contain one aromatic ring or two fused or linked aromatic rings, e.g., phenyl, naphthyl, biphenyl, diphenylether, diphenylamine, benzophenone, and the like. "Substituted aryl" refers to an aryl moiety substituted with one or more substituent groups, and the terms "heteroatom-containing aryl" and "heteroaryl" refer to aryl substituents in which at least one carbon atom is replaced with a heteroatom, as will be described in further detail infra.

Unless otherwise specified, as used herein in the context of silylation reactions, the term "C—H bond" refers to an acetylenic or alkynyl C—H bond, a terminal olefinic C—H bond, an aromatic (aryl or heteroaryl) C—H bond, or C—H bond of an alkyl, alkoxy, or alkylene group positioned alpha to an aromatic / heteroaromatic ring system (e.g., benzylic, or 2, 5-dimethylthiophene substrates), such as previously described in any of the references cited herein showing the propensity to be silylated using simultaneous mixing of the precursor substrate, hydrosilane/organosilane, and strong bases, including hydroxides.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 6 to 24 carbon atoms, and particularly preferred aryloxy groups contain 6 to 14 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Preferred alkaryl and aralkyl groups contain 7 to 24 carbon atoms, and particularly preferred alkaryl and aralkyl groups contain 7 to 16 carbon atoms. Alkaryl groups include, for example, p-methylphenyl, 2,4-dimethylphenyl, p-cyclohexylphenyl, 2, 7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like. The terms "alkaryloxy" and "aralkyloxy" refer to substituents of the formula —OR wherein R is alkaryl or aralkyl, respectively, as just defined.

The term "acyl" refers to substituents having the formula —(CO)-alkyl, —(CO)-aryl, or —(CO)-aralkyl, and the term "acyloxy" refers to substituents having the formula —O(CO)-alkyl, —O(CO)-aryl, or —O(CO)-aralkyl, wherein "alkyl," "aryl, and "aralkyl" are as defined above.

The terms "cyclic" and "ring" refer to alicyclic or aromatic groups that may or may not be substituted and/or heteroatom-containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic, or polycyclic. The term "acyclic" refers to a structure in which the double bond is not contained within a ring structure.

The terms "halo," "halide," and "halogen" are used in the conventional sense to refer to a chloro, bromo, fluoro, or iodo substituent.

"Hydrocarbyl" refers to univalent hydrocarbyl radicals containing 1 to about 30 carbon atoms, preferably 1 to about 24 carbon atoms, most preferably 1 to about 12 carbon atoms, including linear, branched, cyclic, saturated, and unsaturated species, such as alkyl groups, alkenyl groups, aryl groups, and the like. The term "lower hydrocarbyl" intends a hydrocarbyl group of 1 to 6 carbon atoms, preferably 1 to 4 carbon atoms, and the term "hydrocarbylene" intends a divalent hydrocarbyl moiety containing 1 to about 30 carbon atoms, preferably 1 to about 24 carbon atoms, most preferably 1 to about 12 carbon atoms, including linear, branched, cyclic, saturated and unsaturated species. The term "lower hydrocarbylene" intends a hydrocarbylene group of 1 to 6 carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom. Similarly, "substituted hydrocarbylene" refers to hydrocarbylene substituted with one or more substituent groups, and the terms "heteroatom-containing hydrocarbylene" and "heterohydrocarbylene" refer to hydrocarbylene in which at least one carbon atom is replaced with a heteroatom. Unless otherwise indicated, the term "hydrocarbyl" and "hydrocarbylene" are to be interpreted as including substituted and/or heteroatom-containing hydrocarbyl and hydrocarbylene moieties, respectively.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus or silicon, typically nitrogen, oxygen or sulfur. Similarly, the term "heteroalkyl" refers to an alkyl substituent that is heteroatom-containing, the term "heterocyclic" refers to a cyclic substituent that is heteroatom-containing, the terms "heteroaryl" and heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include alkoxyaryl, alkylsulfanyl-substituted alkyl, N-alkylated amino alkyl, and the like. Non-limiting examples of heteroaryl substituents include pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups are pyrrolidino, morpholino, piperazino, piperidino, etc.

As used herein, the terms "substrate" or "organic substrate" are intended to connote both discrete small molecules (sometimes described as "organic compounds") and oligomers and polymers containing a C—H group capable of silylation under the described reaction conditions. The term "aromatic moieties" is intended to refer to those portions of the compounds, pre-polymers (i.e., monomeric compounds capable of polymerizing), oligomers, or polymers having at least one of the indicated aromatic structures. Where shown as structures, the moieties contain at least that which is shown, as well as containing further functionalization, substituents, or both, including but not limited to the functionalization described as "Fn" herein.

By "substituted" as in "substituted hydrocarbyl," "substituted alkyl," "substituted aryl," and the like, as alluded to in some of the aforementioned definitions, is meant that in the hydrocarbyl, alkyl, aryl, heteroaryl, or other moiety, at least one hydrogen atom bound to a carbon (or other) atom is replaced with one or more non-hydrogen substituents. Examples of such substituents include, without limitation: functional groups referred to herein as "Fn," such as halo (e.g., F, Cl, Br, I), hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_1$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl ((CO)—O-alkyl), $C_6$-$C_{24}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{24}$ arylcarbonato (—O—(CO)—O-aryl), carboxy (—COOH), carboxylato (—COO—), carbamoyl (—(CO)—NH$_2$), mono-($C_1$-$C_{24}$ alkyl)-substituted carbamoyl (—(CO)NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_1$-$C_{24}$ haloalkyl)-substituted carbamoyl (—(CO)—NH($C_1$-$C_{24}$ alkyl)), di-($C_1$-$C_{24}$ haloalkyl)-substituted carbamoyl (—(CO)—N($C_1$-$C_{24}$ alkyl)$_2$), mono-($C_5$-$C_{24}$ aryl)-substituted carbamoyl (—(CO)—NH-aryl), di-($C_5$-$C_{24}$ aryl)substituted carbamoyl (—(CO)—N($C_5$-$C_{24}$ aryl)$_2$), di-N—($C_1$-$C_{24}$ alkyl),N—($C_5$-$C_{24}$ aryl)-substituted carbamoyl, thiocarbamoyl (—(CS)—NH$_2$), mono-($C_1$-$C_{24}$ alkyl)-substituted thiocarbamoyl (—(CO)—NH($C_1$-$C_{24}$ alkyl)), di-($C_1$-$C_{24}$ alkyl)-substituted thiocarbamoyl (—(CO)—N($C_1$-$C_{24}$ alkyl)$_2$), mono-($C_5$-$C_{24}$ aryl)substituted thiocarbamoyl (—(CO)—NH-aryl), di-($C_5$-$C_{24}$ aryl)-substituted thiocarbamoyl (—(CO)—N($C_5$-$C_{24}$ aryl)$_2$), di-N—($C_1$-$C_{24}$ alkyl),N—($C_5$-$C_{24}$ aryl)-substituted thiocarbamoyl, carbamido (—NH—(CO)—NH$_2$), cyano(—CN), cyanato (—O—C≡N), thiocyanato (—S—C≡N), formyl (—(CO)—H), thioformyl (—(CS)—H), amino (—NH$_2$), mono-($C_1$-$C_{24}$ alkyl)-substituted amino, di-($C_1$-$C_{24}$ alkyl)-substituted amino, mono-($C_5$-$C_{24}$ aryl)substituted amino, di-($C_5$-$C_{24}$ aryl)-substituted amino, $C_1$-$C_{24}$ alkylamido (—NH—(CO)-alkyl), $C_6$-$C_{24}$ arylamido (—NH—(CO)-aryl), imino (—CR=NH where R=hydrogen, $C_1$-$C_{24}$ alkyl, $C_5$-C24 aryl, $C_6$-$C_{24}$ alkaryl, $C_6$-$C_{24}$ aralkyl, etc.), $C_2$-$C_{20}$ alkylimino (—CR=N(alkyl), where R=hydrogen, $C_1$-$C_{24}$ alkyl, $C_5$-$C_{24}$ aryl, $C_6$-$C_{24}$ alkaryl, $C_6$-$C_{24}$ aralkyl, etc.), arylimino (—CR=N(aryl), where R=hydrogen, $C_1$-$C_{20}$ alkyl, $C_5$-$C_{24}$ aryl, $C_6$-$C_{24}$ alkaryl, $C_6$-$C_{24}$ aralkyl, etc.), nitro (—NO$_2$), nitroso (—NO), sulfo (—SO$_2$OH), sulfonate (SO$_2$O—), $C_1$-$C_{24}$ alkylsulfanyl (—S-alkyl; also termed "alkylthio"), $C_5$-$C_{24}$ arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—SO$_2$-alkyl), $C_1$-$C_{24}$ monoalkylaminosulfonyl-SO$_2$—N(H) alkyl), $C_1$-$C_{24}$ dialkylaminosulfonyl-SO$_2$-N(alkyl)$_2$, $C_2$-$C_{24}$ arylsulfonyl (—SO$_2$-aryl), boryl (—BH$_2$), borono (—B(OH)$_2$), boronato (—B(OR)$_2$ where R is alkyl or other hydrocarbyl), phosphono (—P(O)(OH)$_2$), phosphonato (—P(O)(O)$_2$), phosphinato (P(O)(O—)), phospho (—PO$_2$), and phosphine (—PH$_2$); and the hydrocarbyl moieties $C_1$-$C_{24}$ alkyl (preferably $C_1$-$C_{12}$ alkyl, more preferably $C_1$-$C_6$ alkyl), $C_2$-$C_{24}$ alkenyl (preferably $C_2$-$C_{12}$ alkenyl, more preferably $C_2$-$C_6$ alkenyl), $C_2$-$C_{24}$ alkynyl (preferably $C_2$-$C_{12}$ alkynyl, more preferably $C_2$-$C_6$ alkynyl), $C_5$-$C_{24}$ aryl (preferably $C_5$-$C_{24}$ aryl), $C_6$-$C_{24}$ alkaryl (preferably $C_6$-$C_{16}$ alkaryl), and $C_6$-$C_{24}$ aralkyl (preferably $C_6$-$C_{16}$ aralkyl). Within these substituent structures, the "alkyl," "alkylene," "alkenyl," "alkenylene," "alkynyl," "alkynylene," "alkoxy," "aromatic," "aryl," "aryloxy," "alkaryl," and "aralkyl" moieties may be optionally fluorinated or perfluorinated. Additionally, reference to alcohols, aldehydes, amines, carboxylic acids, ketones, or other similarly reactive functional groups also includes their protected analogs. For example, reference to hydroxy or alcohol also includes those substituents wherein the hydroxy is protected by acetyl (Ac), benzoyl (Bz), benzyl (Bn), β-Methoxyethoxymethyl ether (MEM), dimethoxytrityl, [bis-(4-methoxyphenyl)phenylmethyl] (DMT), methoxymethyl ether (MOM), methoxytrityl [(4-methoxyphenyl)diphenylmethyl, p-methoxybenzyl ether (PMB), methylthiomethyl ether, pivaloyl (Piv), tetrahydropyranyl (THP), tetrahydrofuran (THF), trityl (triphenylmethyl, Tr), silyl ether (most popular ones include trimethylsilyl (TMS), tert-butyldimethylsilyl (TBDMS), tri-isopropylsilyloxymethyl (TOM), and triisopropylsilyl (TIPS) ethers), ethoxyethyl ethers (EE). Reference to amines also includes those substituents wherein the amine is protected by a BOC glycine, carbobenzyloxy (Cbz), p-methoxybenzyl carbonyl (Moz or MeOZ), tert-butyloxycarbonyl (BOC), 9-fluorenylmethyloxycarbonyl (FMOC), acetyl (Ac), benzoyl (Bz), benzyl (Bn), carbamate, p-methoxybenzyl (PMB), 3,4-dimethoxybenzyl (DMPM), p-methoxyphenyl (PMP), tosyl (Ts) group, or sulfonamide (Nosyl & Nps) group. Reference to substituent containing a carbonyl group also includes those substituents wherein the carbonyl is protected by an acetal or ketal, acylal, or diathane group. Reference to substituent containing a carboxylic acid or carboxylate group also includes those substituents wherein the carboxylic acid or carboxylate group is protected by its methyl ester, benzyl ester, tert-butyl ester, an ester of 2,6-disubstituted phenol (e.g. 2,6-dimethylphenol, 2,6-diisopropylphenol, 2,6-di-tert-butylphenol), a silyl ester, an orthoester, or an oxazoline. Preferred substituents are those identified herein as not or less affecting the silylation chemistries, for example, including those substituents comprising alkyls; alkoxides, aryloxides, aralkylalkoxides, protected carbonyl groups; aryls optionally substituted with F, Cl, —$CF_3$; epoxides; N-alkyl aziridines; cis- and trans-olefins; acetylenes; pyridines, primary, secondary and tertiary amines; phosphines; and hydroxides.

By "functionalized" as in "functionalized hydrocarbyl," "functionalized alkyl," "functionalized olefin," "functionalized cyclic olefin," and the like, is meant that in the hydrocarbyl, alkyl, aryl, heteroaryl, olefin, cyclic olefin, or other moiety, at least one hydrogen atom bound to a carbon (or other) atom is replaced with one or more functional groups such as those described herein and above. The term "functional group" is meant to include any of the substituents described herein with the ambit of "Fn.".

In addition, the aforementioned functional groups may, if a particular group permits, be further substituted with one or more additional functional groups or with one or more hydrocarbyl moieties such as those specifically enumerated above. Analogously, the above-mentioned hydrocarbyl moieties may be further substituted with one or more functional groups or additional hydrocarbyl moieties such as those specifically enumerated.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom or organic moiety, and, thus, the description includes structures wherein a non-hydrogen substituent is present and structures wherein a non-hydrogen substituent is not present.

As used herein, the terms "organosilane" or "hydrosilane" may be used interchangeably and refer to a compound or reagent having at least one silicon-hydrogen (Si—H) bond and preferably at least one carbon-containing moiety. The hydrosilane may further contain a silicon-carbon, a silicon-oxygen (i.e., encompassing the term "organosiloxane"), a silicon-nitrogen bond, or a combination thereof, and may be monomeric, or contained within an oligomeric or polymeric framework, including being tethered to a heterogeneous or homogeneous support structure. The term "hydrosilane" also include deuterosilanes, in which the corresponding S—H bond is enriched in Si-D cogeners.

As used herein, the terms "organodisilane" and "disilane" are used interchangeably and refer to a compound or reagent having at least one Si—Si bond. These terms include those embodiments where the disilane contains at least one Si—H bond and those embodiments wherein the disilane no silicon-hydrogen (Si—H) bonds. While the present disclosure refers to the reaction of compounds having Si-Si bonds, the optional presence of Si—H bonds may allow the reaction to proceed through reaction manifolds also described for silylations using organosilane reagents. Such a Si—H pathway is not required for silylation to proceed in the disilane systems, but where the silylating reagent contains both a Si-Si and Si—H bond, the reactions may operate in parallel with one another. The organodisilane may further contain a silicon-carbon, a silicon-oxygen, a silicon-nitrogen bond, or a combination thereof, and may be monomeric, or contained within an oligomeric or polymeric framework, including being tethered to a heterogeneous or homogeneous support structure.

As used herein, unless explicitly stated to the contrary, the organosilanes or organodisilanes are intended to refer to materials that contain no Si-halogen bonds. However, in some embodiments, the organosilanes or organodisilanes may contain a Si-halogen bond.

As used herein, the terms "silylating" or "silylation" refer to the forming of carbon-silicon bonds, in a position previously occupied by a carbon-hydrogen bond. Silylating may be seen as dehydrogenative coupling of a C—H and Si—H bond or a C—H and Si-Si bond to form a C—Si bond.

As used herein, the term "substantially free of a transition-metal compound" is intended to reflect that the system is stable (in the context of the preconditioned compositions) and effective for its intended purpose of silylating the C—H bonds under the relatively mild conditions described herein (in the case of the methods), even in the absence of any exogenous (i.e., deliberately added or otherwise) transition-metal catalyst(s). While certain embodiments provide that transition metals, including those capable of catalyzing silylation reactions, may be present within the systems or methods described herein at levels normally associated with such catalytic activity (for example, in the case where the substrates comprise metallocenes), the presence of such metals (either as catalysts or spectator compounds) is not required and in many cases is not desirable. As such, in many preferred embodiments, the system and methods are "substantially free of transition-metal compounds." Unless otherwise stated, then, the term "substantially free of a transition-metal compound" is defined to reflect that the total level of transition metal within the silylating system, independently or in the presence of organic substrate, is less than about 5 ppm, as measured by ICP-MS. When expressly stated as such, additional embodiments also provide that the concentration of transition metals is less than about 10 wt %, 5 wt %, 1 wt %, 100 ppm, 50 ppm, 30 ppm, 25 ppm, 20 ppm, 15 ppm, 10 ppm, or 5 ppm to about 1 ppm or 0 ppm. As used herein, the term "transition metal" is defined to include d-block elements, for example Ag, Au, Co, Cr, Rh, Ir, Fe, Ru, Os, Ni, Pd, Pt, Cu, Zn, or combinations thereof. In further specific independent embodiments, the concentration of Ni, as measured by ICP-MS, is less than 25 ppm, less than 10 ppm, less than 5 ppm, or less than 1 ppm.

Likewise, the term "substantial absence of a heteroaromatic, olefinic, or acetylenic substrate capable of C—H silylation" is intended to reflect that the compounds or preconditioned compositions contain substoichiometric amounts of these materials relative to the amount of precursor hydrosilane, or the absence of added substrate materials, and preferably no added substrates capable of being otherwise silylated at a C—H position, under the stated conditions. Such unsaturated organic substrate especially refer to the heteraromatic substrate, but also the terminal olefinic or acetylylinic substrates described in the patent applications cited elsewhere herein.

While it may not be necessary to limit the system's exposure to water and oxygen, the presence of these materials may materially affect the stability of the preconditioned mixtures, the hydride compounds, or the rate of the subsequent silylation reactions, for example by the formation of free radical intermediates. In some embodiments, the chemical systems and the methods are substantially free of water, oxygen, or both water and oxygen. In other embodiments, air and/or water are present. Unless otherwise specified, the term "substantially free of water" refers to levels of water less than about 500 ppm and "substantially free of oxygen" refers to oxygen levels corresponding to partial pressures less than 1 torr. Where stated, additional independent embodiments may provide that "substantially free of water" refers to levels of water less than 1.5 wt %, 1 wt %, 0.5 wt %, 1000 ppm, 500 ppm, 250 ppm, 100 ppm, 50 ppm, 10 ppm, or 1 ppm and "substantially free of oxygen" refers to oxygen levels corresponding to partial pressures less than 50 torr, 10 torr, 5 torr, 1 torr, 500 millitorr, 250 millitorr, 100 millitorr, 50 millitorr, or 10 millitorr. In the General Procedure described herein, deliberate efforts were made to exclude both water and oxygen, unless otherwise specified.

The term "terminally silylated olefinic product" refers to an olefinic product of the reactions as described herein, and includes terminally substituted vinyl silanes or allylic silanes. The term "terminally silylated olefinic moiety" refers to the silyl moiety of the terminally silylated olefinic product, whether the product is an allylic or vinyl silyl compound. The term "terminally hydrosilylated product" refers to a product in wherein the silyl group is positioned at a terminal position of an ethylene linkage, typically the result of an anti-Markovnikov hydrosilylation addition to a vinyl aromatic substrate.

The following listing of Embodiments is intended to complement, rather than displace or supersede, the previous descriptions.

Embodiment 1

A composition prepared by preconditioning a mixture of:
(a) a precursor hydrosilane or organodisilane; and
(b) a base comprising or consisting essentially of potassium hydroxide, a potassium alkoxide, a potassium silanolate (e.g., KOTMS), rubidium hydroxide, a rubidium alkoxide, a rubidium silanolate, cesium hydroxide, a cesium alkoxide, a cesium silanolate, a potassium amide (e.g., potassium bis(trimethylsilyl) amide), a potassium graphite (e.g., $KC_8$), or a combination thereof; the preconditioning comprising or consisting essentially of holding the mixture of combined hydrosilane and the base at conditions sufficient to produce the composition capable of initiating measurable silylation of 1-methyl indole at a temperature of 45° C. (or less) with an induction period of less than 30, 25, 20, 15, 10, 5, or 1 minutes. In certain Aspects of this Embodiment, the composition is free of added heteroaromatic, olefinic, or acetylenic substrates.

Embodiment 2

A composition comprising a Si—H-based species derived or derivable from the preconditioning reaction as described in Embodiment 1 between:
(a) a precursor hydrosilane; and
(b) a base comprising or consisting essentially of potassium hydroxide, a potassium alkoxide, a potassium silanolate (e.g., KOTMS), rubidium hydroxide, a rubidium alkoxide, a rubidium silanolate, cesium hydroxide, a cesium alkoxide, a cesium silanolate, a potassium amide (e.g., potassium bis(trimethylsilyl) amide), or a combination thereof; and wherein the precursor hydrosilane exhibits an absorption peak in the Si—H stretching region of infrared spectrum and the Si—H-based species exhibits an absorption peak in the Si—H stretching region of an infrared spectrum that is of lower energy than the absorption peak of the precursor hydrosilane, when evaluated under comparable conditions. In some Aspects of this Embodiment, the Si—H-based species is or comprises an hypercoordinated silicon species containing a Si—H bond. In certain Aspects of this Embodiment, the composition is free of added heteroaromatic, olefinic, or acetylenic substrates. The term "derivable" connotes that the composition may be derived, but is not necessarily derived, from the reaction between the precursor hydrosilane and the base.

Embodiment 3

The composition of Embodiment 1 or 2, wherein the composition further comprises a solvent. In other Aspects of this Embodiment, the composition is solvent-free (i.e., the hydrosilane or organodisilane and the base are present as a neat mixture). In some Aspects of this Embodiment, the composition is a solution comprising a hydrocarbon solvent. In some preferred Aspects of this Embodiment, the composition is a solution comprising an oxygen donor-containing solvent, such as described elsewhere herein, preferably an ether-type solvent, more preferably an optionally substituted tetrahydrofuran, for example 2-methyl tetrahydrofuran.

Embodiment 4

The composition of any one of Embodiment 1 to 3, wherein the base comprises potassium hydroxide, rubidium hydroxide, or cesium hydroxide.

Embodiment 5

The composition of any one of Embodiments 1 to 3, wherein the base comprises potassium hydroxide.

Embodiment 6

The composition of any one of Embodiment 1 to 3, wherein the base comprises a potassium alkoxide, a rubidium alkoxide, or a cesium alkoxide.

Embodiment 7

The composition of any one of Embodiments 1 to 3, wherein the base comprises a potassium alkoxide.

Embodiment 8

The composition of any one of Embodiments 1, 6, or 7, wherein the alkoxide comprises a $C_{1-6}$ alkoxide, such as methoxide, ethoxide, propoxide, or butoxide, preferably tert-butyl butoxide.

Embodiment 9

The composition of any one of Embodiments 1 to 8, wherein the precursor hydrosilane is of the Formula (I) or Formula (II):

$$(R)_{3-m}Si(H)_{m+1} \quad (I)$$

$$(R)_{3-m}(H)_mSi-Si(R)_{2-m}(H)_{m+1} \quad (II)$$

where: m is independently 0, 1, or 2; and each R is independently optionally substituted $C_{1-24}$ alkyl or heteroalkyl, optionally substituted $C_{2-24}$ alkenyl, optionally substituted $C_{2-24}$ alkynyl, optionally substituted $C_{6-12}$ aryl, $C_{3-12}$ heteroaryl, optionally substituted $C_{7-13}$ alkaryl, optionally substituted $C_{4-12}$ heteroalkaryl, optionally substituted $C_{7-13}$ aralkyl, optionally substituted $C_{4-12}$ heteroaralkyl, optionally substituted —O—$C_{1-24}$ alkyl, optionally substituted $C_{6-12}$ aryloxy, optionally substituted $C_{3-12}$ heteroaryloxy, optionally substituted $C_{7-13}$ alkaryloxy, optionally substituted $C_{4-12}$ heteroalkaryloxy, optionally substituted $C_{6-12}$ aralkoxy, or $C_{4-12}$ heteroaralkoxy, and, if substituted, the substituents may be phosphonato, phosphoryl, phosphanyl, phosphino, sulfonato, $C_1$-$C_{20}$ alkylsulfanyl, $C_5$-$C_{20}$ arylsulfanyl, $C_1$-$C_{20}$ alkylsulfonyl, $C_5$-$C_{20}$ arylsulfonyl, $C_1$-$C_{20}$ alkylsulfinyl, 5 to 12 ring-membered arylsulfinyl, sulfonamido, amino, amido, imino, nitro, nitroso, hydroxyl, $C_1$-$C_{20}$ alkoxy, $C_5$-$C_{20}$ aryloxy, $C_2$-$C_{20}$ alkoxycarbonyl, $C_5$-$C_{20}$ aryloxycarbonyl, carboxyl, carboxylato, mercapto, formyl, $C_1$-$C_{20}$ thioester, cyano, cyanato, thiocyanato, isocyanate, thioisocyanate, carbamoyl, epoxy, styrenyl, silyl, silyloxy, silanyl, siloxazanyl, boronato, boryl, or halogen, or a metal-containing or metalloid-containing group, where the metalloid is Sn or Ge, where the substituents may optionally provide a tether to an insoluble or sparingly soluble support media comprising alumina, silica, or carbon. In certain Aspects of this Embodiment, the precursor organodisilane is of the Formula (III)

$$(R')_3Si-Si(R')_3 \quad (III)$$

where R' is R, as defined above, or may additionally comprise optionally substituted alkoxy or aryloxy moieties or trimethylsiloxy. In other Aspects of this Embodiment, R or R' is independently an optionally substituted alkyl, alkenyl, alkynyl, aryl, and/or heteroaryl moiety, the specifics of which are further described elsewhere. R' may also independently comprise optionally substituted alkoxy or aryloxy moieties or trimethylsiloxy.

Embodiment 10

The composition of any one of Embodiments 1 to 9, wherein the at least one hydrosilane is $(R)_3SiH$ or $(R)_2SiH_2$, where R is independently at each occurrence $C_{1-6}$ alkyl, phenyl, tolyl, or pyridinyl. I n certain Aspects of this Embodiment, R is independently at each occurrence methyl, ethyl, propyl, butyl, propyl, phenyl, biphenyl, benzyl, or pyridinyl, for example $EtMe_2SiH$, $PhMe_2SiH$, $BnMe_2SiH$, $(n-Bu)_3SiH$, $Et_2SiH_2$, $Me_3SiH$, $Et_3SiH$, $n-Pr_3SiH$, $i-Pr_3SiH$, $n-Bu_3SiH$, $sec-Bu_3SiH$, $tert-Bu_3SiH$, $Me_2(pyridinyl)SiH$, or $Me_3Si-SiMe_2H$. In certain Aspects of this Embodiment, these substituents are optionally substituted.

Embodiment 11

The composition of Embodiment 10, that is a solution, wherein the base comprises potassium tert-butoxide.

Embodiment 12

The composition of any one of Embodiments 1 to 11, wherein the composition contains no added transition metal or transition metal species. In certain Aspects of this Embodiment, transition metals or transition metal species are present at less than 1%, 1000 ppm, 100 ppm, 50 ppm, or 10 ppm, based on the total weight of the composition.

Embodiment 13

The composition of any one of Embodiments 1 to 11, wherein the composition is an ether-based solution, most preferably tetrahydrofuran or 2-methyl-tetrahydrofuran.

Embodiment 14

Figure 3:
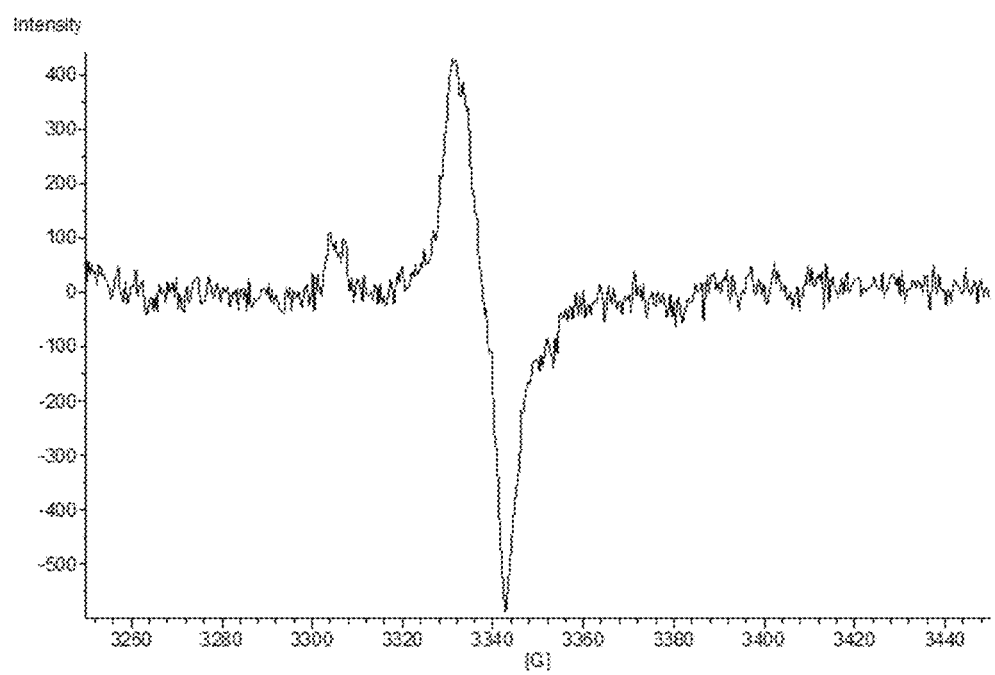
FIG. 3 shows an EPR spectrum taken in THF at 77K at 9.377 GHz, 2.036 mW power.

The composition of Embodiment 13, which in tetrahydrofuran further exhibits an electron paramagnetic resonance (EPR) signal in THF centered at g=2.0007 substantially as shown in FIG. 3.

Embodiment 15

A compound, or a composition comprising the compound itself, having an optionally solvated silicon hydride structure of Formula (IV):

$$\left[ \begin{array}{c} R^S_{\prime\prime\prime\prime} \overset{H}{\underset{|}{\phantom{|}}} \\ R^{S\prime} - \underset{|}{Si} - R^S \\ R^BO \end{array} \right]^{\ominus} M^+ \quad (IV)$$

or a geometric isomer thereof, wherein $M^+$ is or comprises a cation comprising potassium, rubidium, cesium, or a combination thereof;

—$OR^B$ is or comprises hydroxide, an alkoxide, an alkyl silanolate; or a combination thereof; and —$R^S$ is or comprises H, —R, or —$Si(R)_{3-m}H_m$, or a combination thereof where m is and R is as described elsewhere herein; or an isomer thereof.

Embodiment 16

A compound that is the addition product of (a) potassium hydroxide, a potassium alkoxide, a potassium silanolate, rubidium hydroxide, a rubidium alkoxide, a rubidium silanolate, cesium hydroxide, a cesium alkoxide, a cesium silanolate, or a combination thereof with (b) a precursor hydrosilane of Formula (I) or (II), or any of the individual precursor hydrosilanes as described elsewhere herein.

Embodiment 17

A compound or composition of any one of Embodiments 1 to 16 that is free of added heteroaromatic, olefinic, or acetylenic substrates. In certain Aspects of this Embodiment, the term "free" connotes free of added substrates.

Embodiment 18

A method comprising silylating an organic substrate having a C—H bond or an alcoholic O—H bond, the method comprising contacting the organic substrate with a composition or compound of any one of Embodiments 1 to 17;

wherein the contacting results in the formation of a C—Si bond in the position previously occupied by the C—H bond, or the formation of an O—Si bond in the position previously occupied by the O—H bond;

wherein the C—H bond is:
(a) located on a heteroaromatic moiety;
(b) located on an alkyl, alkoxy, or alkylene moiety positioned alpha to an aryl or heteroaryl moiety;
(c) an alkynyl C—H bond; or
(d) a terminal olefinic C—H bond; and wherein the preconditioned mixture is able to initiate measurable silylation of 1-methyl indole at a temperature of 45° C. (or less) with an induction period of less than 30, 25, 20, 15, 10, 5, or 1 minutes. Each of the substrates or classes substrates is considered an independent Embodiment. In certain individual Aspects of this Embodiment, the precursor hydrosilane is a compound of Formula (I) or (II), or any individual hydrosilane as described herein.

Embodiment 19

A method comprising silylating at least one organic substrate containing a C—H bond or —OH bond, the method comprising contacting the organic substrate with
(a) a precursor hydrosilane; and
(b) a base comprising or consisting essentially of cesium hydroxide, rubidium hydroxide, $KC_8$, or a combination thereof; wherein the C—H bond is:
(a) located on a heteroaromatic moiety;
(b) located on an alkyl, alkoxy, or alkylene moiety positioned alpha to an aryl or heteroaryl moiety;
(c) an alkynyl C—H bond; or
(d) a terminal olefinic C—H bond; and
wherein the contacting results in the formation of a C—Si bond in the position previously occupied by the C—H bond or an O—Si bond in the position previously occupied by the O—H bond. Each of the substrates or classes of these substrates is considered an independent Embodiment. In certain individual Aspects of this Embodiment, the precursor hydrosilane is a compound of Formula (I) or (II), or any individual hydrosilane as described herein. In other individual Aspects of this Embodiment, the precursor organodisilane is a compound of Formula (III), or any individual hydrosilane as described herein

Embodiment 20

The method of Embodiment 19, wherein the precursor hydrosilane or organodisilane and the base are preconditioned before contacting with the organic substrate, the preconditioning comprising holding a mixture comprising the precursor hydrosilane and the base at one or more temperatures in a range of from about 25° C. to about 125° C. for a time in a range of from about 30 minutes to about 24 hours, the combination of time and temperature being sufficient to produce the composition capable of initiating measurable silylation of 1-methyl indole at a temperature of 45° C. (or less) with an induction period of less than 30, 25, 20, 15, 10, 5, or 1 minutes.

Embodiment 21

The method of any one of Embodiments 18 to 20, wherein the organic substrate is a heteroaromatic moiety, for example comprising an optionally substituted furan, pyrrole, thiophene, pyrazole, imidazole, triazole, isoxazole, oxazole, thiazole, isothiazole, oxadiazole, pyridine, pyridazine, pyrimidine, pyrazine, triazone, benzofuran, benzothiophene, isobenzofuran, isobenzothiophene, indole, isoindole, indolizine, indazole, azaindole, benzisoxazole, benzoxazole, quinoline, isoquinoline, cinnoline, quinazoline, naphthyridine, 2,3-dihydrobenzofuran, 2,3-dihydrobenzopyrrole, 2,3-dihydrobenzothiophene, dibenzofuran, xanthene, dibenzopyrol, or dibenzothiophene moiety. In certain Aspects of this Embodiment, the organic substrate is a heteroaryl substrate as described in U.S. patent application Ser. No. 14/043,929, filed Oct. 2, 2013 (heteroaromatics with alkoxides), now U.S. Pat. No. 9,000,167 or Ser. No. 14/818,417, filed Aug. 5, 2015 (heteroaromatics with hydroxides), each of which is incorporated by reference herein at least for these teachings.

Embodiment 22

The method of any one of Embodiments 18 to 20, wherein the organic substrate comprises as alkynyl C—H bond having a formula:

$$R^3\text{—}C\equiv C\text{—}H,$$

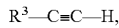

where $R^3$ comprises an optionally substituted $C_{1-18}$ alkyl, optionally substituted $C_{2-18}$ alkenyl, optionally substituted $C_{2-18}$ alkynyl, optionally substituted $C_{6-18}$ aryl, optionally substituted $C_{6-18}$ aryloxy, optionally substituted $C_{7-18}$ aralkyl, optionally substituted $C_{7-18}$ aralkyloxy, optionally substituted $C_{3-18}$ heteroaryl, optionally substituted $C_{3-18}$ heteroaryloxy, optionally substituted $C_{4-18}$ heteroarylalkyl, optionally substituted $C_{4-18}$ heteroaralkyloxy, or optionally substituted metallocene. In certain Aspects of this Embodiment, the organic substrate is an alkyne as described in U.S. patent application Ser. No. 14/841,964 filed Sep. 1, 2015 (alkynes), now U.S. Pat. No. 9,556,206, which is incorporated by reference herein at least for these teachings.

Embodiment 23

The method of any one of Embodiments 18 to 20, wherein the at least one organic substrate comprises a terminal olefin has a Formula (V):

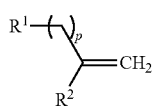

(V)

where p is 0 or 1; $R^1$ and $R^2$ independently comprises H, an optionally substituted $C_{1-18}$ alkyl, optionally substituted $C_{2-18}$ alkenyl, optionally substituted $C_{2-18}$ alkynyl, optionally substituted $C_{6-18}$ aryl, optionally substituted $C_{1-18}$ heteroalkyl, optionally substituted 5-6 ring membered heteroaryl, optionally substituted 5-6 ring membered aralkyl, optionally substituted 5-6 ring membered heteroaralkyl, or optionally substituted metallocene, provided that le and $R^2$ are not both H. In certain Aspects of this Embodiment, the organic substrate is any one having a terminal olefin as described in U.S. patent application Ser. No. 15/166,405 (terminal olefins), filed May 27, 2016, which is incorporated by reference herein at least for these teachings.

Embodiment 23

The method of any one of Embodiments 18 to 20, wherein the at least one organic substrate comprises an alcoholic —OH group, having a structure of Formula (VIA) or (VIB).

$R^4$—OH (VIA)

HO—$R^5$—OH (VIB), where $R^4$ comprises an optionally substituted $C_{1-24}$ alkyl, optionally substituted $C_{2-24}$ alkenyl, optionally substituted $C_{2-24}$ alkynyl, optionally substituted $C_{6-24}$ aryl, optionally substituted $C_{1-24}$ heteroalkyl, optionally substituted 5-or 6-ring membered heteroaryl, optionally substituted $C_{7-24}$ aralkyl, optionally substituted heteroaralkyl, or optionally substituted metallocene; and where $R^5$ comprises an optionally substituted $C_{2-12}$ alkylene, optionally substituted $C_{2-12}$ alkenylene, optionally substituted $C_{6-24}$ arylene, optionally substituted $C_{1-12}$ heteroalkylene, or an optionally substituted 5- or 6-ring membered heteroarylene. In some Aspect of this Embodiments, the organic substrate having at least one organic alcohol moiety is or comprises an optionally substituted catechol moiety or has a Formula (IV):

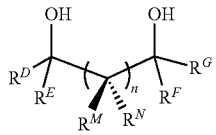

(IV)

wherein n is from 0 to 6, preferably 0 or 1;
$R^M$ and $R^N$ are independently H or methyl
$R^D$, $R^E$, $R^F$, and $R^G$ are independently H, $C_{1-6}$ alkyl, $C_{1-6}$ alkenyl, optionally substituted phenyl, optionally substituted benzyl, or an optionally substituted 5-or 6-ring membered heteroaryl, wherein the optional substituents are $C_{1-3}$ alkyl, $C_{1-3}$ alkoxy, or halo. Within this genus, the organic substrate includes substituted 1,2-diols, 1,3-diols, 1,4-diols, these being substituted with one or more alkyl and/or optionally substituted aryl or heteroaryl substituents. In certain Aspects of this Embodiment, the organic substrate is any one having a terminal olefin as described in U.S. patent application Ser. No. 15/219,710 (alcohols with hydroxides), filed Jul. 26, 2016, which is incorporated by reference herein for all purposes, or at least for these teachings.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein.

In the following examples, efforts have been made to ensure accuracy with respect to numbers used (e.g. amounts, temperature, etc.) but some experimental error and deviation should be accounted for. Unless indicated otherwise, temperature is in degrees C., pressure is at or near atmospheric.

Example 1

General Information

Unless otherwise stated, reactions were performed in a nitrogen-filled glovebox or in flame-dried glassware under an argon or nitrogen atmosphere using dry, deoxygenated solvents. Solvents were dried by passage through an activated alumina column under argon. Reaction progress was monitored by thin-layer chromatography (TLC), GC or Agilent 1290 UHPLC-MS. TLC was performed using E. Merck silica gel 60 F254 precoated glass plates (0.25 mm) and visualized by UV fluorescence quenching, p-anisaldehyde, or $KMnO_4$ staining. Silicycle SiliaFlash® P60 Academic Silica gel (particle size 40-63 nm) was used for flash chromatography. $^1H$ NMR spectra were recorded on Varian Inova 500 MHz or Bruker 400 MHz spectrometers and are reported relative to residual $CHCl_3$ (δ 7.26 ppm), $C_6H_6$ (δ 7.16 ppm), or THF (δ 3.58, 1.72 ppm). $^{13}C$ NMR spectra were recorded on a Varian Inova 500 MHz spectrometer (125 MHz) or Bruker 400 MHz spectrometers (100 MHz) and are reported relative to $CHCl_3$ (δ 77.16 ppm). Data for $^{13}C$ NMR are reported in terms of chemical shifts (δ ppm). IR spectra were obtained by use of a Perkin Elmer Spectrum BXII spectrometer or Nicolet 6700 FTIR spectrometer using thin films deposited on NaCl plates and reported in frequency of absorption (cm$^{-1}$). GC-FID analyses were obtained on an Agilent 6850N gas chromatograph equipped with a HP-1 100% dimethylpolysiloxane capillary column (Agilent). GC-MS analyses were obtained on an Agilent 6850 gas chromatograph equipped with a HP-5 (5%-phenyl)-methylpolysiloxane capillary column (Agilent). High resolution mass spectra (HRMS) were obtained from Agilent 6200 Series TOF with an Agilent G1978A Multimode source in electrospray ionization (ESI+), atmospheric pressure chemical ionization (APCI+), or mixed ionization mode (MM: ESI–APCI+), or obtained from Caltech mass spectrometry laboratory. FT-ATR IR measurements were carried out on a Thermo Scientific Nicolet iS 5 FT-IR spectrometer equipped with an iD5 ATR accessory. ReactIR measurements were carried out on a Mettler-Toledo ReactJR ic10 using a K4 conduit with a Sentinel high-pressure probe and SiComp window. Electron paramagnetic resonance (EPR) spectra were acquired on a X-band Bruker EMX spectrometer. An Omnical SuperCRC or Insight CPR 220 reaction calorimeter were used to monitor heat flow.

Triethyl silane (99%, Sure/Seal™) and KOt-Bu (sublimed grade, 99.99% trace metals basis) were purchased from Aldrich and used directly. KOH was pulverized and dried in a desiccator over $P_2O_5$ under vacuum for 24 h prior to use. Other reagents were purchased from Sigma-Aldrich, Acros Organics, Strem, or Alfa Aesar and used as received unless otherwise stated.

Example 2

Representative Conditions

Example 2.1

Reaction Conditions

General reaction procedure: In a nitrogen-filled glovebox, catalyst (KOtBu, 0.5 equiv.) was measured into an oven-dried 2 mL glass vial. The olefin substrate (1.0 equiv) was then added to the vial. Solvent (DME, dimethoxyethane) to make a 1 M concentration of olefin in DME) and silane (3.0 equiv) are then added, a Teflon stir-bar is placed into the vial, and the reaction is sealed and stirred for 24-96 h at temperatures ranging from 45-150° C. The reaction was quenched by diluting with diethyl ether; the solution was filtered through a short plug of silica then concentrated under reduced pressure. Purification by column chromatography afforded the pure compounds detailed below. The yield was determined by $^1$H NMR or GC-FID analysis of the crude mixture using an internal standard. Cis-/trans- ratios were determined by NMR or GC-FID.

Example 2.2

General Method for the Screening of Base Catalysts and Kinetic Profile

In a nitrogen-filled glove box, 1-methylindole (0.5 mmol, 1 equiv), triethylsilane (1.5 mmol, 3 equiv), the indicated base (0.1 mmol, 20 mol %), and THF (5 mL) were added to a 1 dram vial equipped with a magnetic stirring bar. At the indicated time, aliquots were removed using a glass capillary tube, diluted with Et$_2$O, and analyzed using GC-FID to determine regioselectivity and yield. GC conversion is reported as product (C2- and C3-silylation) divided by product and starting material. The results are shown in Table 1.

TABLE 1

Results of Evaluating Base Catalysts

| entry | catalyst | time (h) | conv (%) | 2:3 |
|---|---|---|---|---|
| 1 | KOt-Bu | 10 | 88 | 11:1 |
| 2 | KOEt | 10 | 55 | 9:1 |
| 3 | KOMe | 20 | 35 | 9:1 |
| 4 | KOTMS | 20 | 53 | 12:1 |
| 5 | KOAc | 60 | 0 | — |
| 6 | KOH | 20 | 52 | 11:1 |
| 7 | KH | 36 | 0 | — |
| 8 | KC$_8$ | 10 | 73 | 8:1 |
| 9 | CsOH•H$_2$O | 10 | 64 | 8:1 |
| 10 | RbOH•xH$_2$O | 10 | 38 | 10:1 |
| 11 | LiOt-Bu | 36 | 0 | — |
| 12 | NaOt-Bu | 36 | 0 | — |
| 13 | Mg(Ot-Bu)$_2$ | 36 | 0 | — |
| 14 | Ca(Oi-Pr)$_2$ | 36 | 0 | — |
| 15 | Ba(Ot-Bu)$_2$ | 36 | 0 | — |
| 16 | Al(Ot-Bu)$_3$ | 36 | 0 | — |

Example 2.3

Procedure for Time Course Reaction Monitoring by in situ $^1$H NMR

In a nitrogen-filled glove box, a stock solution containing KOt-Bu (60.5 mg, 0.539 mmol) and 1,2,5-trimethoxybenzene (if used, 45.4 mg, 0.267 mmol) is prepared in THF-D$_8$ (2.7 ml). Continuing in the glove box, a J-Young gas-tight NMR tube is then charged with 1-methylindole (32.8 mg, 0.25 mmol, 1 equiv), Et$_3$SiH (0.75 mmol, 3 equiv), and 0.25 mL of stock solution. The tube is tightly capped with the corresponding Teflon plug, removed from the glove box, placed in the bore of the NMR, and heated to 45° C. $^1$H NMR spectra were acquired in "array" mode, with a spectrum taken approximately every 3 minutes for the length of experiment. The data was processed using MestReNova and peak integrations were normalized to 1,2,5-trimethoxybenzene (if used).

A study was conducted following the procedure for time course reaction monitoring by $^1$H NMR (using internal standard) while varying 1-methyl-indole [1], from 0.25-0.76 mmol (0.5-1.5 equiv). A burst phase of product formation followed an initial induction phase, unfortunately due to the induction period it was difficult to assign an initial rate for this phase but all trials appear to have a similar rate during the burst phase. The length of the burst phase (i.e. product formed) appears to be related to the nature of the substrate. Interestingly, after the burst phase the slope of all plots appear to be consistent, indicating the reaction may not depend on the nature of the substrate. See FIGS. 2 and 4. This work helped demonstrate that silylation reaction occurred in the following 3 regimes; induction, burst, and sustained reaction periods.

Example 2.4

Procedure for Time Course Reaction Monitoring by GC Analysis of Reaction Aliquots In a nitrogen-filled glove box, 1 dram vials with magnetic stirring bars were charged with the indicated base (0.1 mmol, 20 mol %, RbOH supplied as unknown hydrate from Strem and used as received), 1-methylindole (65.6 mg, 0.5 mmol, 1 equiv), triethylsilane (174.4 mg, 1.5 mmol, 3 equiv) and THF (0.5 mL, 1M) then sealed with a PTFE-lined screw-cap and heated to 45° C. while stirring. At the indicated time points, an aliquot was removed with a clean, dry glass capillary tube, diluted with Et$_2$O, and analyzed by GC-FID. Conversion is reported as the percent of both C2- and C3-silylation products divided by products and starting material. Regioselectivity (i.e. C2- to C3-silylation ratios, Table 2) were also obtained at each time point.

TABLE 2

| Base | Time (h) | Conversion | C2:C3 ratio (x:1) |
|---|---|---|---|
| KOt-Bu | 1.0 | 0.0 | — |
|  | 2.0 | 0.0 | — |
|  | 3.0 | 25.8 | 27.3 |
|  | 4.0 | 44.2 | 24.1 |
|  | 5.0 | 57.4 | 23.2 |
|  | 6.0 | 66.5 | 12.8 |
|  | 8.0 | 81.4 | 16.9 |
|  | 10.0 | 88.0 | 15.0 |
|  | 20.0 | 89.2 | 15.0 |
|  | 36.0 | 91.0 | 9.3 |

TABLE 2-continued

| Base | Time (h) | Conversion | C2:C3 ratio (x:1) |
|---|---|---|---|
| KOTMS | 1.0 | 0.0 | — |
|  | 2.0 | 0.0 | — |
|  | 3.0 | 0.0 | — |
|  | 4.0 | 3.9 | 7.1 |
|  | 5.0 | 10.2 | 9.9 |
|  | 6.0 | 17.7 | 9.0 |
|  | 8.0 | 26.2 | 19.9 |
|  | 10.0 | 33.0 | 14.1 |
|  | 20.0 | 50.4 | 11.6 |
|  | 36.0 | 59.9 | 9.0 |
| KHMDS | 1.0 | 0.0 | — |
|  | 2.0 | 0.0 | — |
|  | 3.0 | 0.0 | — |
|  | 4.0 | 1.2 | >20 |
|  | 5.0 | 2.5 | >20 |
|  | 6.0 | 4.7 | 9.7 |
|  | 8.0 | 8.3 | 15.0 |
|  | 10.0 | 10.3 | 11.0 |
|  | 20.0 | 21.6 | 21.5 |
|  | 36.0 | 34.9 | 7.3 |
| KOEt | 1.0 | 19.7 | — |
|  | 2.0 | 24.8 | 26.8 |
|  | 3.0 | 30.6 | 22.3 |
|  | 4.0 | 35.7 | 19.4 |
|  | 5.0 | 38.5 | 19.2 |
|  | 6.0 | 40.9 | 11.4 |
|  | 8.0 | 51.1 | 14.0 |
|  | 10.0 | 54.9 | 12.5 |
|  | 20.0 | 67.1 | 8.2 |
|  | 36.0 | 75.6 | 6.2 |
| KOMe | 1.0 | 0.0 | — |
|  | 2.0 | 0.0 | — |
|  | 3.0 | 0.0 | — |
|  | 4.0 | 1.2 | >20 |
|  | 5.0 | 2.5 | >20 |
|  | 6.0 | 5.6 | 7.0 |
|  | 8.0 | 15.7 | 15.4 |
|  | 10.0 | 24.2 | 12.3 |
|  | 20.0 | 35.2 | 14.9 |
|  | 36.0 | 51.5 | 7.2 |
| KOH | 1.0 | 0.0 | — |
|  | 2.0 | 0.0 | — |
|  | 3.0 | 0.0 | — |
|  | 4.0 | 0.0 | — |
|  | 5.0 | 0.0 | — |
|  | 6.0 | 0.0 | — |
|  | 8.0 | 17.8 | >20 |
|  | 10.0 | 34.3 | 18.4 |
|  | 20.0 | 49.9 | 11.3 |
|  | 36.0 | 63.2 | 7.0 |
| CsOH | 1.0 | 2.2 | >20 |
|  | 2.0 | 14.9 | 21.4 |
|  | 3.0 | 27.6 | 23.0 |
|  | 4.0 | 35.6 | 20.5 |
|  | 5.0 | 42.8 | 19.5 |
|  | 6.0 | 51.2 | 12.1 |
|  | 8.0 | 57.7 | 15.2 |
|  | 10.0 | 64.0 | 11.6 |
|  | 20.0 | 73.2 | 7.7 |
|  | 36.0 | 74.0 | 5.8 |
| RbOH | 1.0 | 0.0 | — |
|  | 2.0 | 0.0 | — |
|  | 3.0 | 5.8 | 5.3 |
|  | 4.0 | 12.1 | 10.5 |
|  | 5.0 | 17.8 | 18.9 |
|  | 6.0 | 23.9 | 19.9 |
|  | 8.0 | 30.8 | 14.1 |
|  | 10.0 | 37.5 | 11.0 |
|  | 20.0 | 48.2 | 9.5 |
|  | 36.0 | 59.4 | 7.9 |
| KC8 | 1.0 | 22.4 | >20 |
|  | 2.0 | 28.0 | 33.1 |
|  | 3.0 | 30.6 | 23.1 |
|  | 4.0 | 41.4 | 21.2 |
|  | 5.0 | 43.7 | 22.8 |
|  | 6.0 | 52.5 | 14.6 |
|  | 8.0 | 63.0 | 14.9 |
|  | 10.0 | 72.6 | 8.5 |
|  | 20.0 | 82.2 | 7.7 |
|  | 36.0 | 84.7 | 5.0 |

Example 2.5

Procedure for Reaction Time Course using ReactIR

The glass reaction vessel for use with the ReactIR Sentinel high-pressure probe and a magnetic stirring bar were oven dried, fitted with the PTFE adapter, and brought into a nitrogen-filled glove box, or cooled under a flow of argon and standard air-free technique is used for all additions. KOt-Bu (0.8 mmol, 20 mol %), 1-methylindole (1.05 g, 8 mmol, 1 equiv), triethylsilane (13.89 mL, 24 mmol, 3 equiv), additive, and THF (8 mL, 1M) were added to reaction vessel, which was fitted to the ReactIR probe and heated to 45° C. while stirring under argon. The spectrum was recorded over the course of the reaction and data was analyzed using the ReactIR software. See FIGS. 5 and 6.

An analogous experiment was performed whereby the indole 1 is not added until the new peak attributed to the hypercoordinated silicate is seen. Indole 1 is then added via syringe and the reaction immediately proceeds with no induction period.

Example 2.6

General Procedure of ATR-FTIR Measurement

Figure 7D:
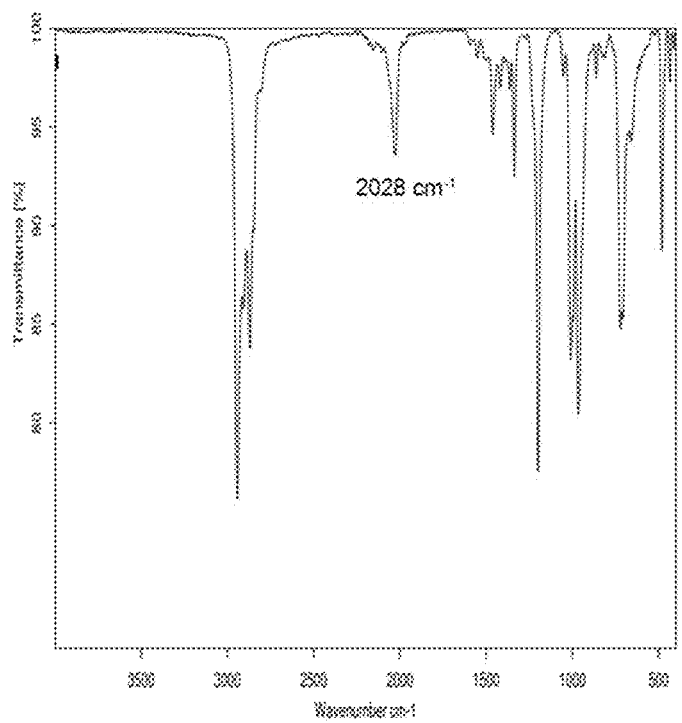
FIG. 7(D) is an IR spectrum of the product of the reaction of KOt-Bu with Et$_3$SiH (5 equiv) in THF at 45° C. for 2 hours, followed by removal of volatiles (including Et$_3$SiH and THF).
Figure 7E:
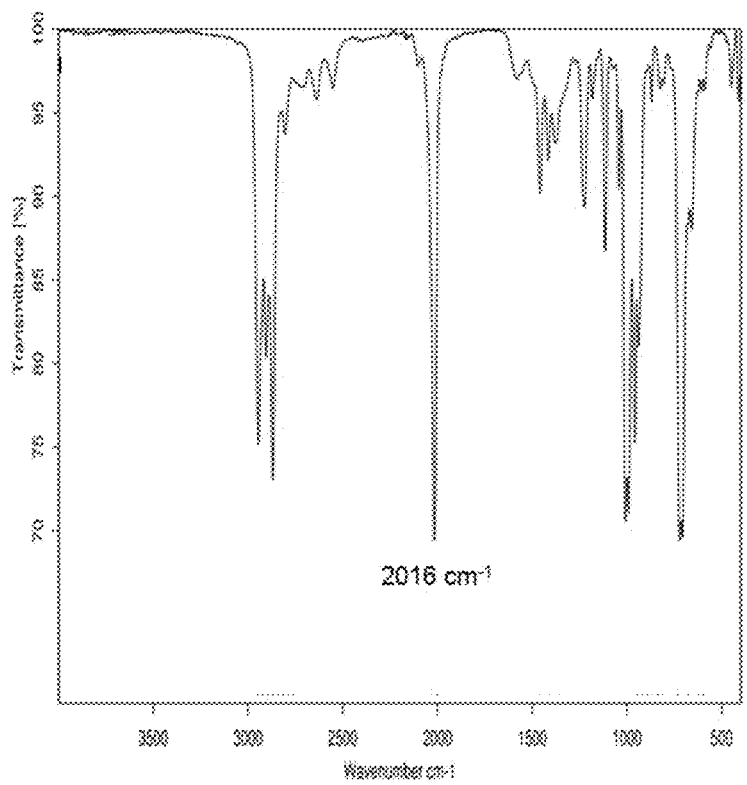
FIG. 7(E) is an IR spectrum of the product of the reaction of KOEt with Et$_3$SiH (5 equiv) in THF at 45° C. for 2 hours, followed by removal of volatiles (including Et$_3$SiH and THF).
Figure 7F:
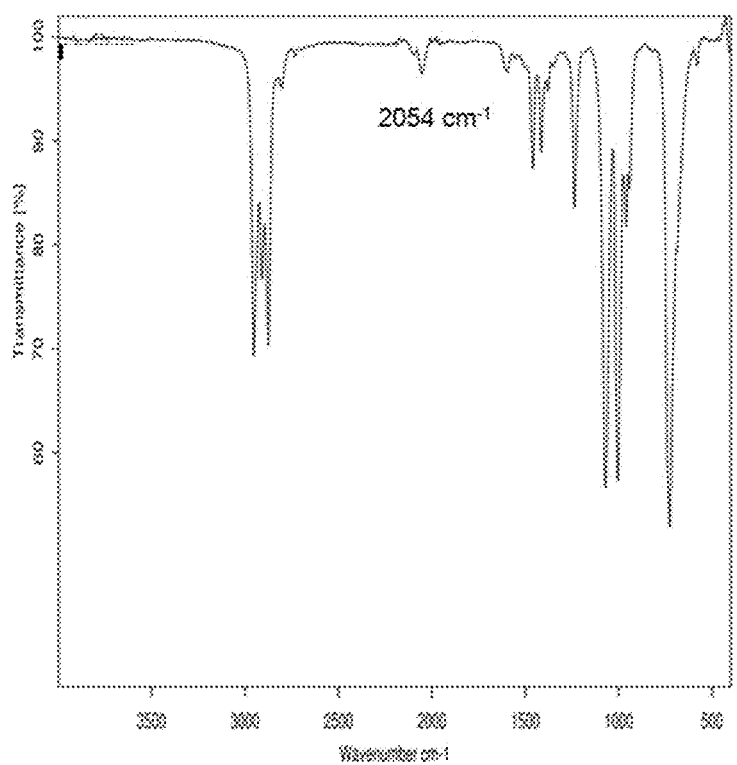
FIG. 7(F) is an IR is an IR spectrum of the product of the reaction of KOMe with Et$_3$SiH (5 equiv) in THF at 45° C. for 2 hours, followed by removal of volatiles (including Et$_3$SiH and THF).
Figure 7G:
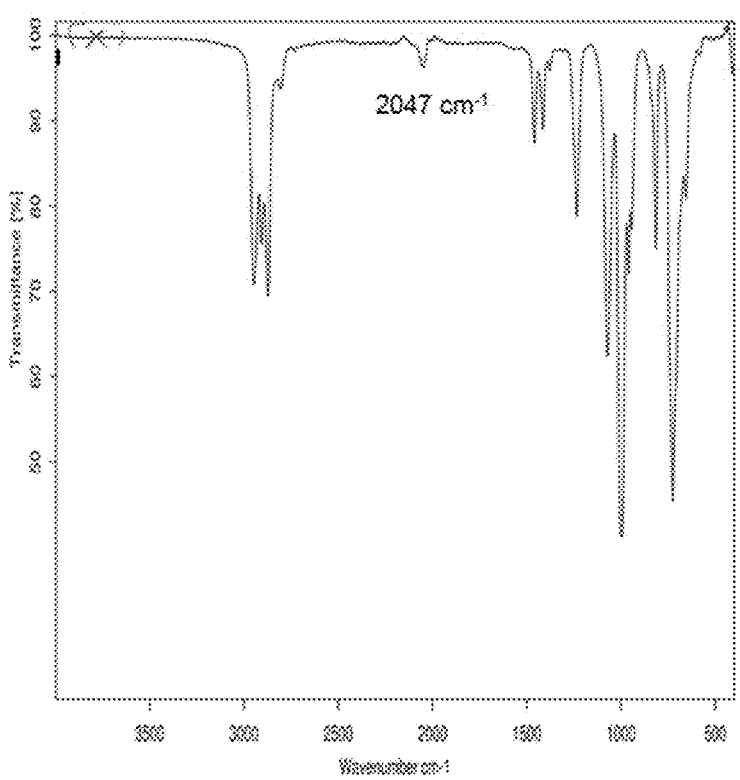
FIG. 7(G) is an IR spectrum of the product of the reaction of KOTMS with Et$_3$SiH (5 equiv) in THF at 45° C. for 2 hours, followed by removal of volatiles (including Et$_3$SiH and THF).
Figure 7H:
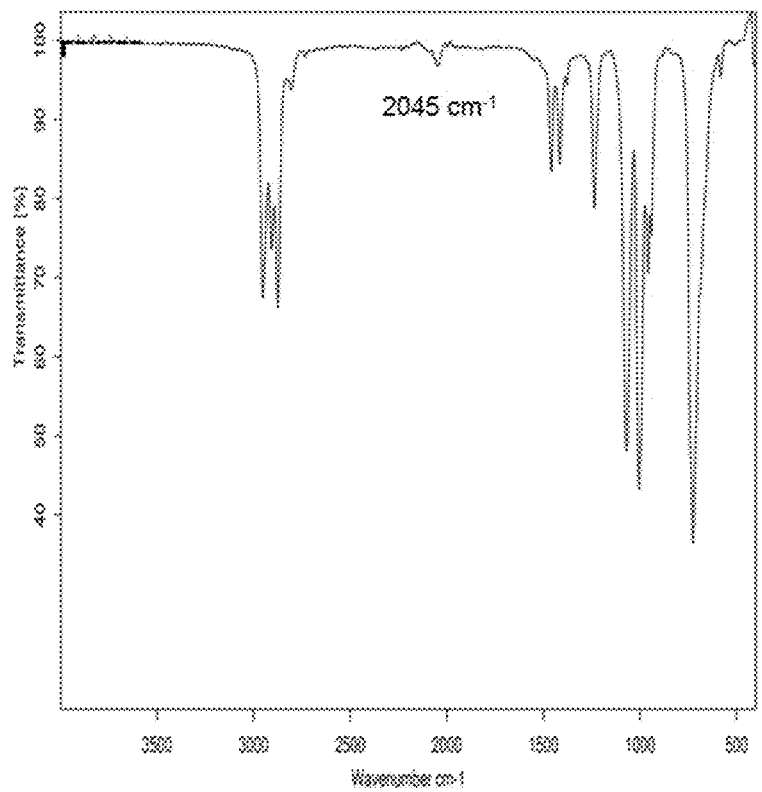
FIG. 7(H) is an IR spectrum of the product of the reaction of KOH with Et$_3$SiH (5 equiv) in THF at 45° C. for 2 hours, followed by removal of volatiles (including Et$_3$SiH and THF).
Figure 7I:
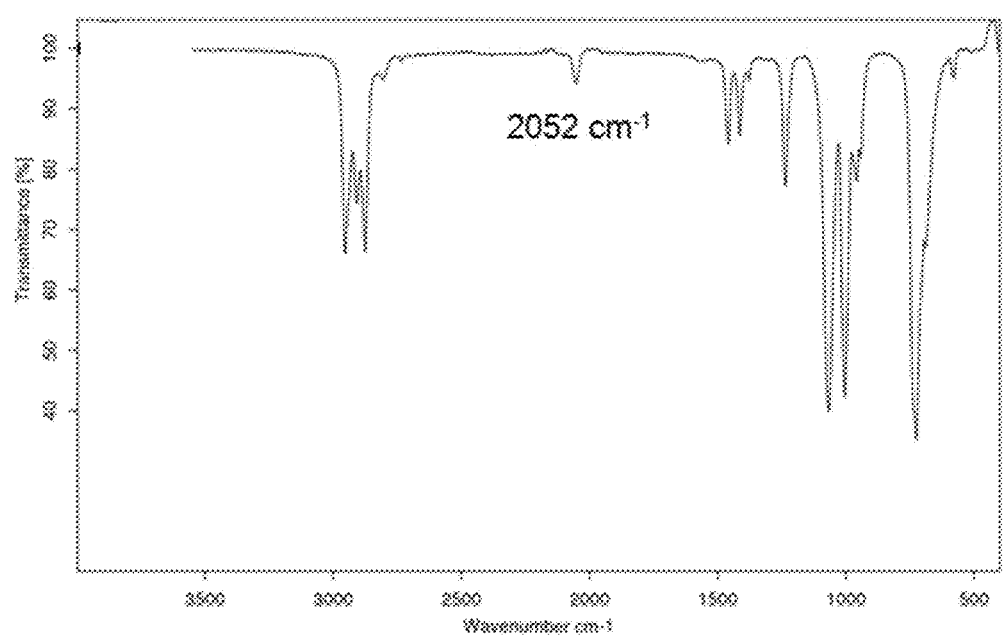
FIG. 7(I) is an IR spectrum of the product of the reaction of RbOH·xH$_2$O with Et$_3$SiH (5 equiv) in THF at 45° C. for 2 hours, followed by removal of volatiles (including Et$_3$SiH and THF).
Figure 7J:
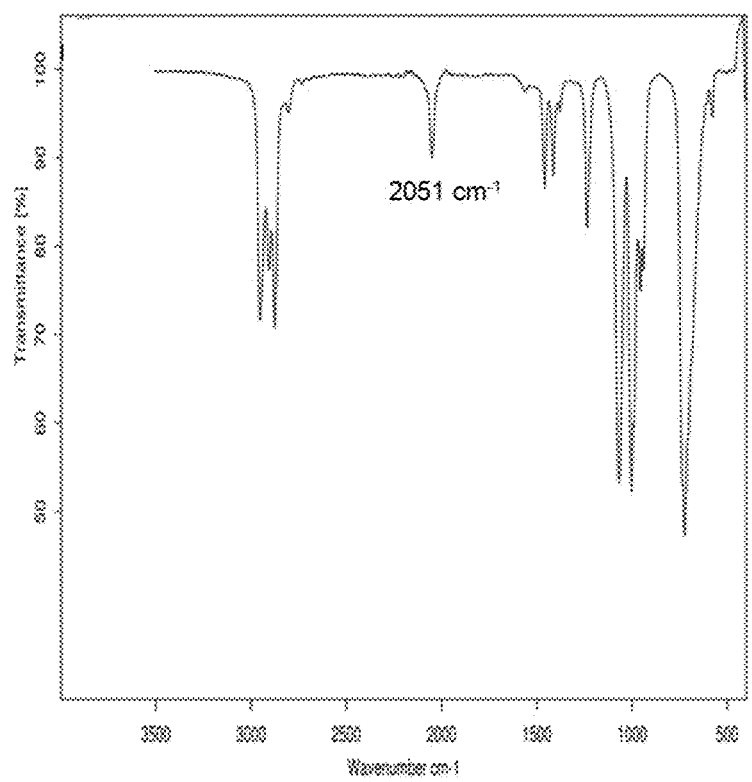
FIG. 7(J) is an IR spectrum of the product of the reaction of CsOH·xH$_2$O with Et$_3$SiH (5 equiv) in THF at 45° C. for 2 hours, followed by removal of volatiles (including Et$_3$SiH and THF).
Figure 7K:
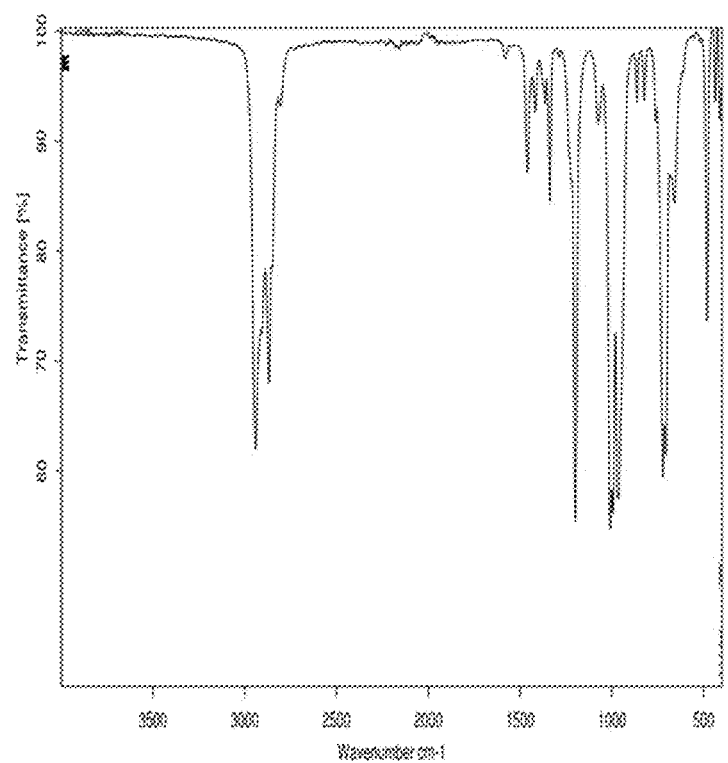
FIG. 7(K) is an IR spectrum of the product of the reaction of KOt-Bu with Et$_3$SiD (5 equiv) in THF-D$_8$ at 45° C. for 2 hours, followed by removal of volatiles (including Et$_3$SiH and THF).
Figure 7L:
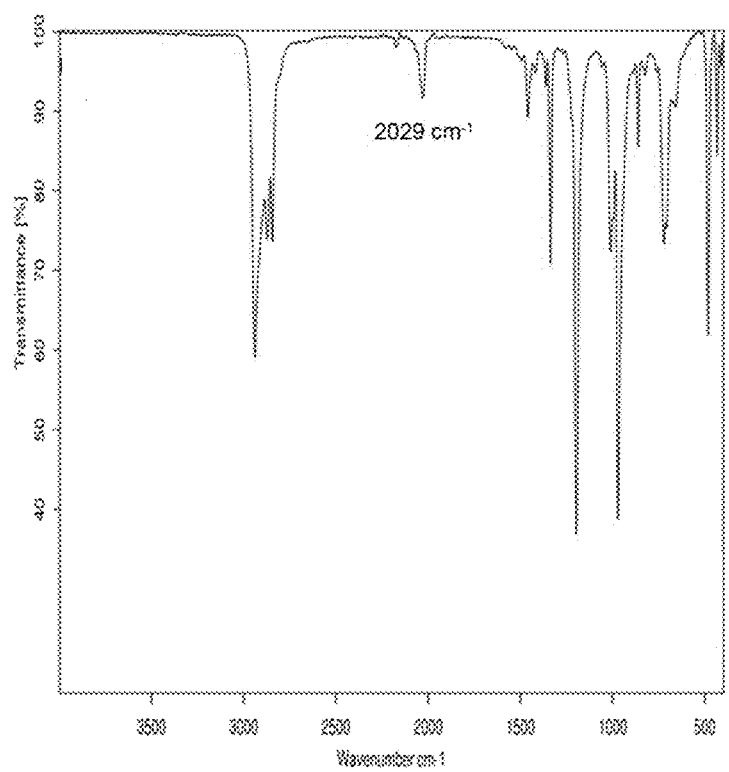
FIG. 7(L) is an IR spectrum of the product of the reaction of KOt-Bu with Et$_3$SiD (2.5 equiv) and Et$_3$SiH (2.5 equiv) in THF-D$_8$ at 45° C. for 2 hours, followed by removal of volatiles (including Et$_3$SiH and THF).
Figure 7M:
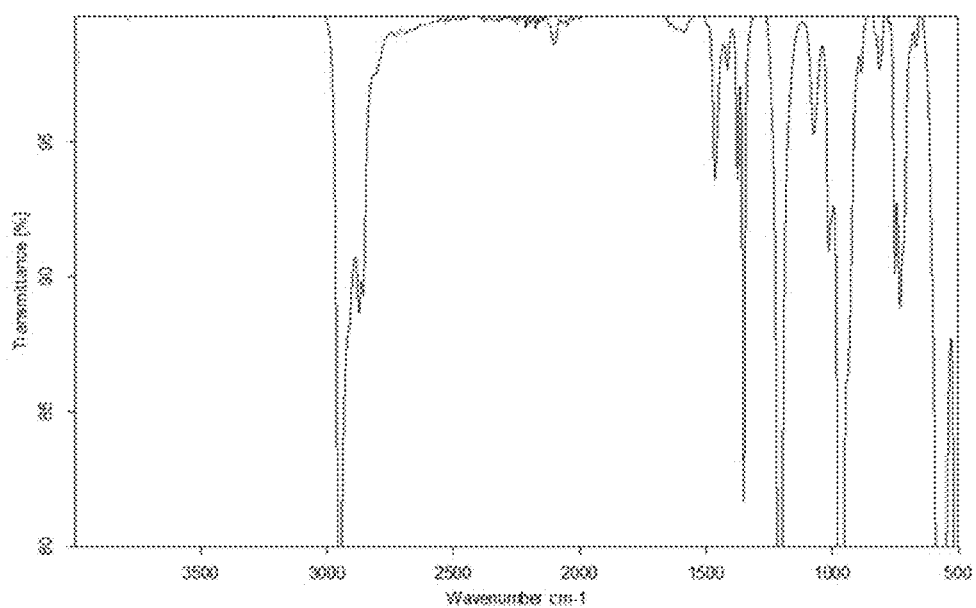
FIG. 7(M) is an IR spectrum of the product of the reaction of LiOt-Bu with Et$_3$SiH (5 equiv) in THF at 45° C. for 2 hours, followed by removal of volatiles (including Et$_3$SiH and THF).
Figure 7N:
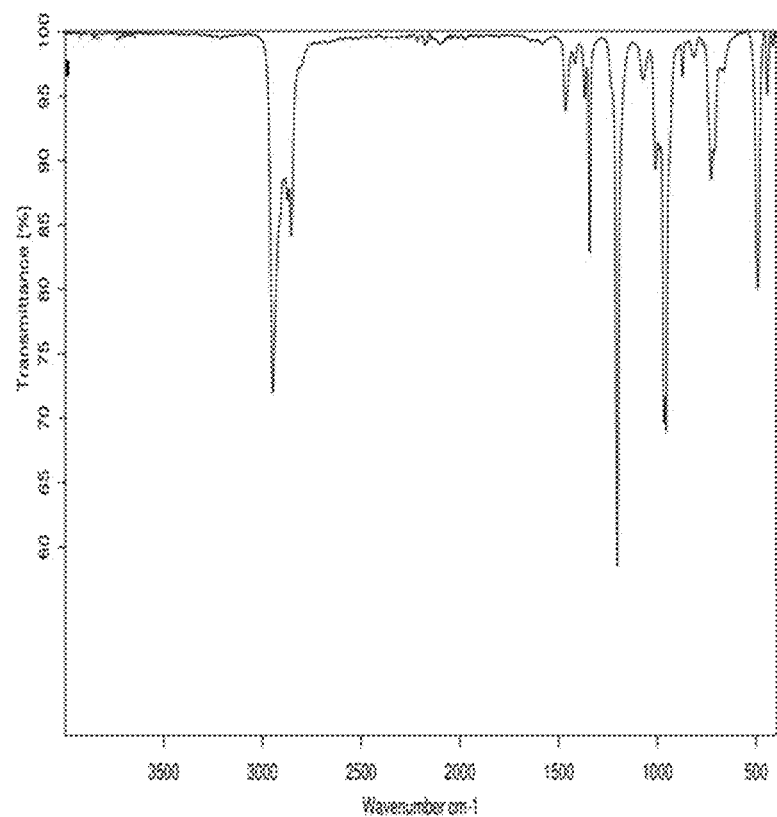
FIG. 7(N) is an IR spectrum of the product of the reaction of NaOt-Bu with Et$_3$SiH (5 equiv) in THF at 45° C. for 2 hours, followed by removal of volatiles (including Et$_3$SiH and THF).
Figure 7O:
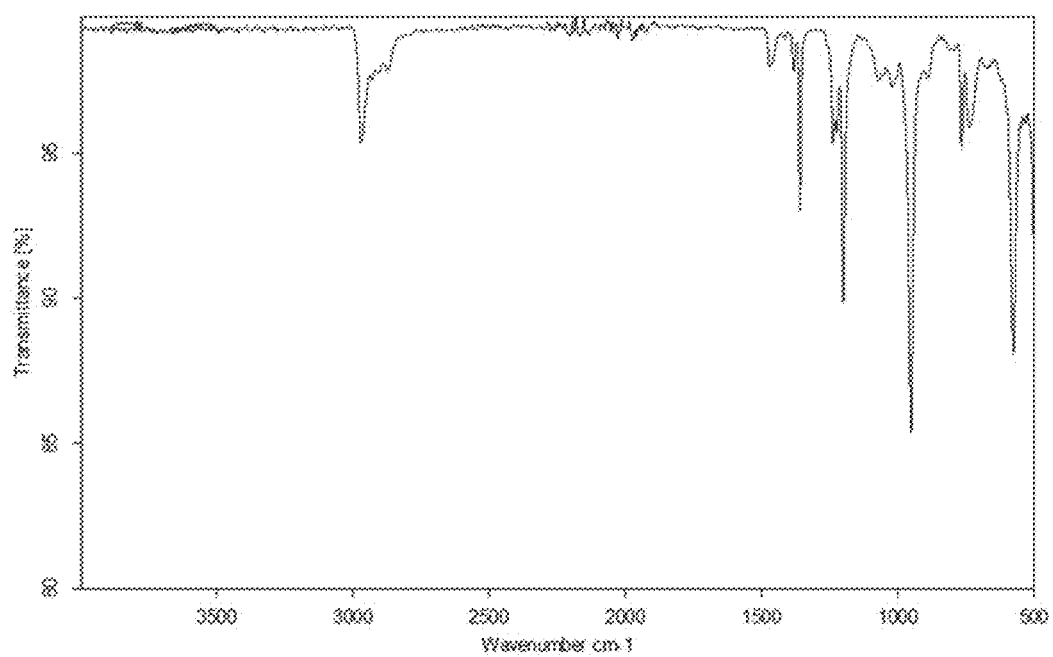
FIG. 7(O) is an IR spectrum of the product of the reaction of Mg(Ot-Bu)$_2$ with Et$_3$SiH (5 equiv) in THF at 45° C. for 2 hours, followed by removal of volatiles (including Et$_3$SiH and THF).

In a nitrogen-filled glove box, base (0.1 mmol), $Et_3SiH$ (80 μL, 0.5 mmol, 5 equiv), and THF (0.5 mL) were added to a 1 dram scintillation vial equipped with a magnetic stirring bar. The vial was sealed and the mixture stirred at 45° C. for the indicated time as shown in Table 3. The vial was transferred to another nitrogen-filled glove box with an ATR-FTIR and a few drops of this mixture placed on the ATR crystal. After waiting for 5 minutes to evaporate all the volatiles (i.e. THF and silanes), the IR spectrum of the residue was recorded. No new Si—H stretch was observed with bases which did not catalyze the silylation reaction (e.g. NaOt-Bu, $Mg(Ot-Bu)_2$, or LiOt-Bu) as these did not form the requisite hypercoordinated complex. See Table 3 and FIGS. 7A-O.

TABLE 3

Spectroscopic characterization of the reaction of Et₃Si—H with the bases evaluation in this study

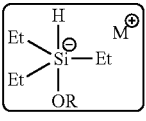

| entry | Base | [Si]—X | t (h)[a] | ν[Si—H](cm⁻¹)[b] | Δν(cm⁻¹)[c] |
|---|---|---|---|---|---|
| 1 | — | Et₃SiH | — | 2099 | — |
| 2 | KOt-Bu | Et₃SiH | 2 | 2028 | 71 |
| 3 | KOEt | Et₃SiH | 2 | 2016 | 83 |
| 4 | KOMe | Et₃SiH | 7 | 2054 | 45 |
| 5 | KOTMS | Et₃SiH | 7 | 2047 | 52 |
| 6 | KOH | Et₃SiH | 20 | 2045 | 54 |
| 7 | RbOH·xH₂O | Et₃SiH | 7 | 2052 | 47 |
| 8 | CsOH·H₂O | Et₃SiH | 7 | 2051 | 48 |
| 9 | NaOt-Bu | Et₃SiH | 36 | — | — |
| 10 | KOt-Bu | Et₃SiD | 12 | — | — |
| 11 | KOt-Bu | Et₃SiH (2.5 equiv) + Et₃SiD (2.5 equiv) | 12 | 2029 | 70 |
| 12 | Mg(Ot-Bu)₂ | Et₃SiH | 36 | — | — |
| 13 | LiOt-Bu | Et₃SiH | 36 | — | — |

[a]The mixture was stirred for the indicated time before IR spectrum was measured.
[b]Frequency of Si—H bond stretching.
[c]Frequency shift of observed hypercoordinated silicon species from Et₃Si—H.

Example 2.7

Other Specific, Representative Examples

Trimethylsilane: In a related experiment, directed to investigating the use of gaseous hydrosilanes, trimethylsilane (Me₃SiH, 15 mmol), KO-tBu (0.076 mmol), and THF (0.38 mL) were added to a Schlenk flask, sealed with a Teflon stopper, and allowed to sit at RT (~23° C.) for approximately 3 weeks. In a N₂ filled glovebox, 1-methylindole (0.38 mmol) was added and the reaction is heated to 45° C. for 48 hours. ¹H-NMR indicated a conversion to 1-methyl-2-trimethylsilyl indole of approximately 73%.

Hexamethyldisilane: In another related experiment, directed to investigating the use of organodisilanes, hexamethyldisilane (2 mmol), KO-tBu (0.2 mmol), and THF (1 mL) were combined in a sealed vial in a nitrogen-filled glovebox and heated to 45° C. for 24 hours. The solution was then allowed to cool and 241 mg of this mixture is added to a vial containing 1-methyl-indole (0.2 mmol). This vial is sealed and heated to 45° C. for 24 hours. ¹H-NMR indicated a conversion to 1-methyl-2-trimethylsilyl indole of approximately 76%.

Benzyl alcohol: In a N₂ filled glove box, benzyl alcohol (0.2 mmol, 21.6 mg, dried by MgSO₄ and 3 Å MS) was added to a vial. Premixed silylation solution (251 mg, containing 0.04 mmol KOtBu, 0.6 mmol Et₃SiH, and 0.2 mL THF) was added and the solution was heated to 45° C. After 48 h the reaction was removed from heat and a white precipitate was observed. The mixture was quenched with Et2O when the precipitate went into solution, transferred to a vial, and concentrated in vacuo. The ¹E1 NMR spectrum showed full conversion to the product benzyloxytriethylsilylether (along with residual silane and a small amount of an unidentified product <0.1 by integration).

Deprotecting N-benzoylindole: In a glovebox, a solution was previously prepared which contained 3 mmol triethylsilane and 0.2 mmol KOtBu per 1 mL THF. This sol was heated to 45° C. for 24 hours then allowed to cool and stored in a glovebox. To 0.2 mmol N-benzoylindole was added 251 mg of the premix sol (containing 0.6 mmol silane, 0.04 mmol KOtBu, and 0.2 mL THF) The vial was sealed and heated to 45° C. for 24 hours. After dilution with Et₂O, a crude NMR was taken which appeared to show a 1:1 of starting material : de-protected indole (i.e., free indole)

Example 3

Discussion

Example 3.1

Effect of Catalyst Identity

The combination of a bulky basic anion and a potassium cation has previously been reported as crucial for the C—H silylation of 1-methylindole and other heteroaromatic substrates. A detailed study of the catalytic competency of a variety of alkali, alkaline earth, and other metal derived bases has been conducted. As shown in Table 1, alkoxides and hydroxides of alkali metals with larger radius cations (i.e. radius ≥K+), such as K⁺, Rb⁺, and Cs⁺ could provide the silylation product in moderate to good yields (Table 1, entries 1-4, 6, 9 and 10).

Among all the catalysts examined, KOt-Bu was proven to be the ideal catalyst, affording the highest overall yield. However, no product was detected when KOAc or KH was employed as the catalyst (entries 5 and 7). Perhaps surprisingly, potassium on graphite (KC8) afforded the desired product in good yield (entry 8). Alkali metal bases with small cations (e.g. LiOt-Bu and NaOt-Bu) demonstrated a complete lack of reactivity and no product was observed even after extended reaction time (entries 11 and 12). Alkoxides of alkali earth metals or aluminum were also investigated as catalysts and failed to afford any product (entries 13-16).

The kinetic behavior of the silylation reaction with KOt-Bu catalyst was studied using in situ ¹H NMR spectroscopy.

Figure 2:
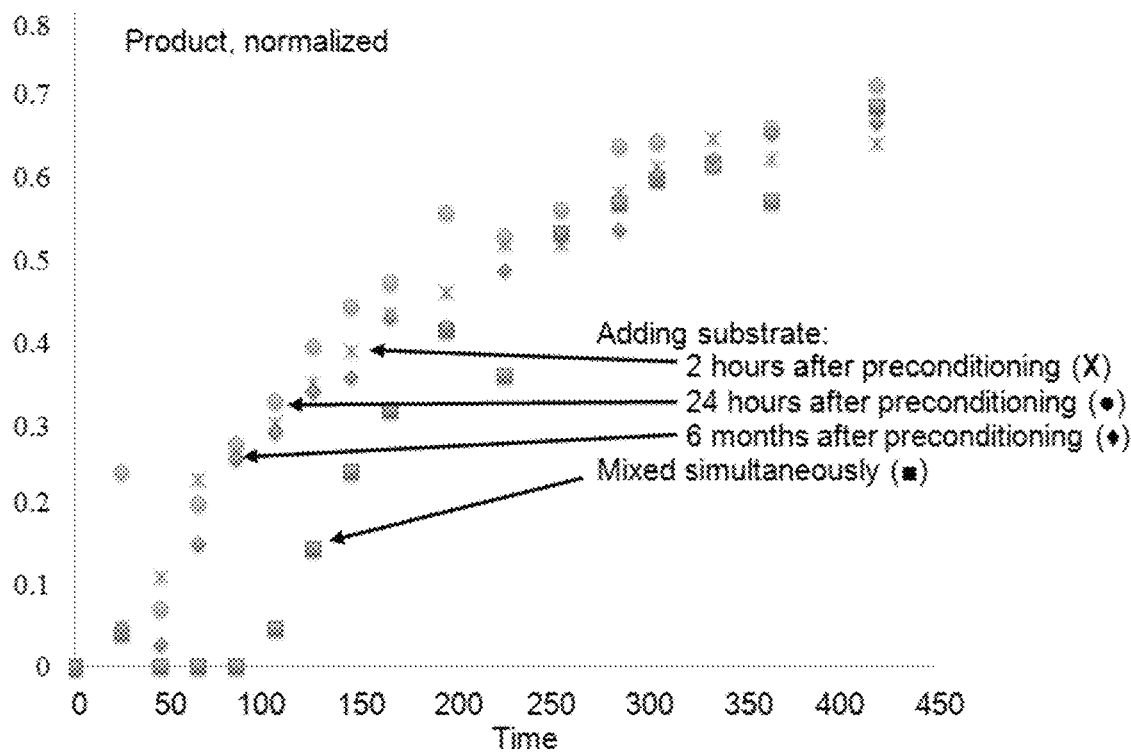
FIG. 2 illustrates the induction period when ingredients mixed simultaneously and the stability of the preconditioned mixtures for the silylation of 1-methylindole when applied 2 hours, 24 hours, and 6 weeks after formation of the preconditioned mixtures

While not previously reported, as depicted in FIGS. 1 and 2, the silylation reaction was found to take place in three stages: an induction period (FIG. 1), an active period ("burst") with rapid formation of product, and a final period with significantly reduced reaction rate. The timeframes of these three stages varied with reaction conditions and reaction components (including hydrosilanes, bases, additives, oxygen, moisture, and solvent), but the induction period was always observed when these ingredients were added simultaneously, or near simultaneously.

Figure 4:
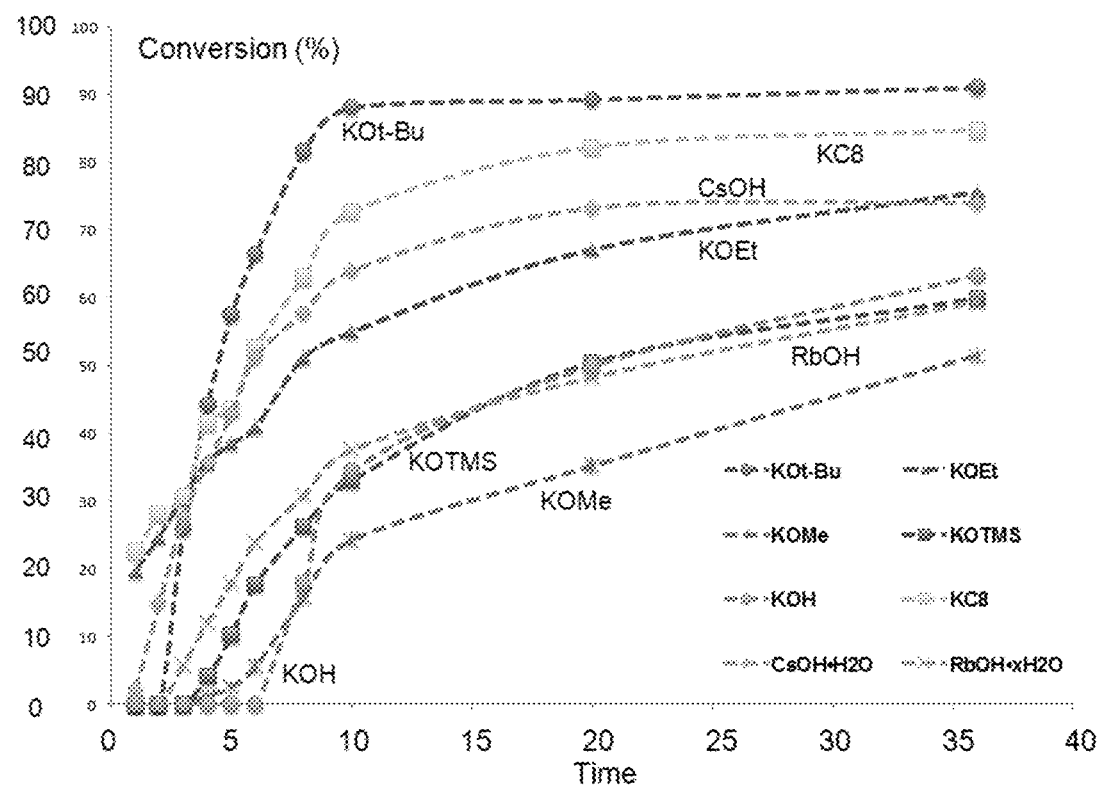
FIG. 4 provides a comparison of the kinetic profiles of multiple base catalysts. Data was acquired via GC analysis of aliquots of crude reaction mixture.

Investigations were then expanded to include each active catalyst presented in Table 1 (FIG. 4). The length of the induction period was found to depend on the nature of both metal and counter ion. For anions, the induction period increased in the order of KC8 (shortest)<KOEt<KOt-Bu<KOH (longest). An increase in induction period was observed with decreasing radius of cations, with CsOH (shortest)<RbOH<KOH (longest). It is worth noting that the induction periods vary based on catalyst loading, solvents, and reaction temperature. Additives, oxygen, and moisture could also have a significant impact on the induction period, generally prolonging the duration of such period. Nevertheless, the induction period showed good reproducibility for identical reactions setup at different times. Although the induction period with KOt-Bu is not the shortest of all catalysts tested (see FIG. 4), this catalyst provides the highest post-initiation turnover frequency and product yield.

Example 3.2

Investigation of Coordinated Silane Species by FTIR Studies

Figure 5:
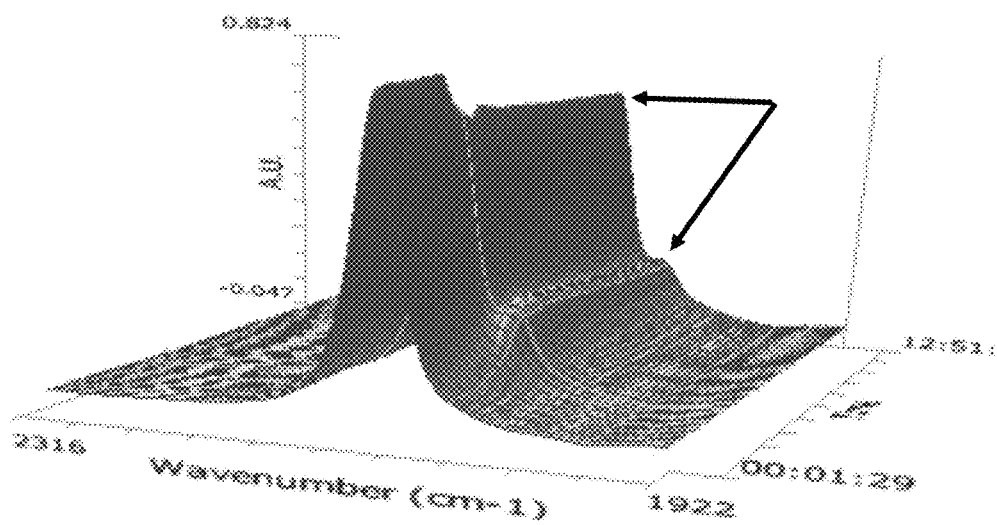
FIG. 5 shows a ReactIR plot of KOt-Bu and Et$_3$SiH in THF. New peak adjacent to Si—H signal of Et$_3$SiH clearly visible.
Figure 6:
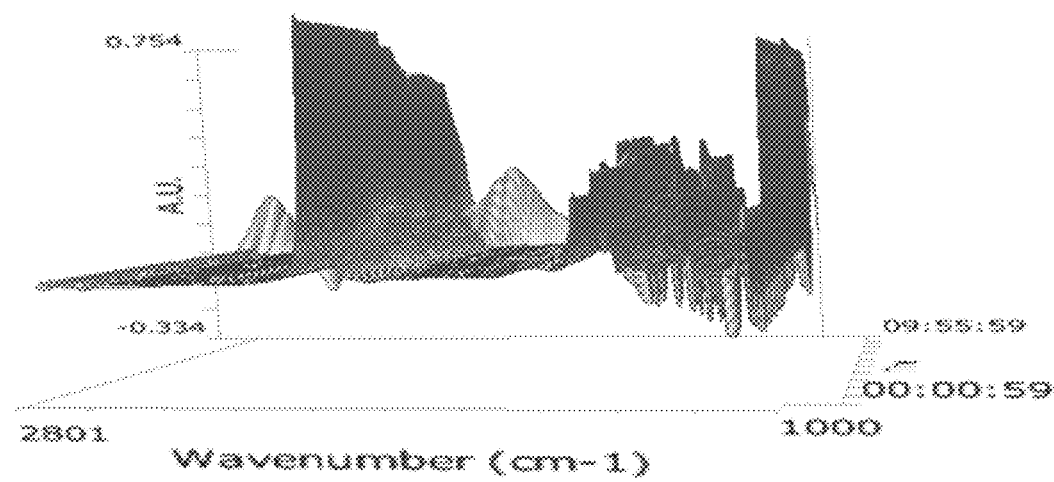
FIG. 6 is a representative ReactIR spectrum showing the growth of the new Si—H peak assigned to the hypercoordinated species, followed by injection of substrate and immediate product formation.

By monitoring the silylation reaction using ReactIR, evidence for the existence of a new, possibly hypercoordinated silicate species was found. As shown in FIGS. 5 and 6, the in situ IR spectrum, a new peak is visible at 2056 cm$^{-1}$ adjacent to the Si—H stretching band in Et$_3$SiH (2100 cm$^{-1}$). This lower frequency peak is consistent with an elongated, weakened Si—H axial bond in a five-coordinate silicate, as expected in such hypercoordinated complexes. A similar shift has been reported previously for the trans Si—H stretching in N,N-dimethylaminopropylsilane [H$_3$Si(CH$_2$)$_3$NMe$_2$] from 2151 to 2107 cm$^{-1}$. In this case, the observed redshift was rationalized to occur because of an N—Si interaction to form a hypercoordinate complex as confirmed by X-ray analysis. In the instant case, a correlation between the newly formed IR peak (FIG. 5) and the onset of product formation (i.e. the induction period ending) was observed. Once the new IR peak reached a steady state, the consumption of 1-methylindole 1 and formation of silylation product occurred immediately. Furthermore, the new IR peak was visible throughout the reaction. This is consistent with the observation that premixing Et$_3$SiH and KOt-Bu in THF for 2 h at 45° C. followed by the addition of 1-methylindole 1 eliminated the induction period. This is also consistent with the fact that the formation of hypercoordinated silicate is responsible for the observed induction period.

Further studies were undertaken with mixtures of Et$_3$SiH and metal alkoxides listed in Table 1 utilizing ATR-FTIR in a nitrogen filled glove box after removal of the volatiles (i.e. THF, Et$_3$SiH). As shown in FIG. 7(A), any alkoxide base which was a competent silylation catalyst developed a lower energy Si—H feature (from 2016-2051 cm$^{-1}$, corresponding to the Si—H bond of a hypercoordinated silicon species. In sharp contrast, no such species were detected with unreactive catalysts [i.e., LiOt-Bu, NaOt-Bu (FIGS. 7(M) and 7(N)), alkali earth metals, or aluminum alkoxides] demonstrating that this new optionally solvated hypercoordinated complex appears to be crucial for the silylation reaction. For the hypercoordinated silicates formed from KOt-Bu and KOEt, the decrease in the frequencies of Si—H absorption correlates to a shortening of induction period (FIGS. 7(D) and 7(E)). Finally, although there is a large variation in the induction periods with KOH, RbOH and CsOH, no differentiating Si—H frequencies of the hypercoordinated silicates derived from those bases are observed. The hydroxides are converted to the silanolates, and subsequently silicates, which serve as the active catalysts.

As those skilled in the art will appreciate, numerous modifications and variations of the present invention are possible in light of these teachings, and all such are contemplated hereby. All references cited within this specification are incorporated by reference, at least for their teachings in the context of their recitation.

What is claimed:

1. A solution composition prepared by preconditioning a mixture of:
   (a) a precursor hydrosilane; and
   (b) a base comprising potassium hydroxide, a potassium alkoxide, a potassium silanolate, rubidium hydroxide, a rubidium alkoxide, a rubidium silanolate, cesium hydroxide, a cesium alkoxide, a cesium silanolate, a potassium amide, or a combination thereof; in
   (c) a preconditioning solvent comprising one or more tetrahydrofurans, wherein the preconditioning solvent comprises 2-methyl-tetrahydrofuran;
   in the absence of any heteroaromatic, olefinic, or acetylenic substrates capable of C—H silylation, or any alcohol substrates; wherein
   the solution composition contains a species formed by the preconditioning of the mixture of (a) and (b) in the preconditioning solvent, wherein the species is present in sufficient amount to exhibit an observable infrared absorption peak in an Si—H stretching region of an infrared spectrum, that infrared absorption peak being of lower energy than a corresponding Si—H absorption peak of the precursor hydrosilane, when evaluated under comparable conditions; and wherein
   (i) the solution composition comprises the preconditioning solvent comprising one or more tetrahydrofurans, wherein the preconditioning solvent comprises 2-methyl-tetrahydrofuran, and is free of any added heteroaromatic, olefinic, or acetylenic substrates capable of C—H silylation by the pre-conditioned mixture, or of any added alcohol substrates;
   (ii) the preconditioning comprises holding the mixture of combined hydrosilane and the base in the preconditioning solvent under conditions sufficient to produce the solution composition, which is capable of initiating measurable silylation of 1-methyl indole at a temperature of 45° C. or less with an induction period of less than 30 minutes;
   (iii) the precursor hydrosilane is of the Formula (I) or Formula (II):

$(R)_{3-m}Si(H)_{m+1}$ (I)

$(R)_{3-m}(H)_mSi—Si(R)_{2-m}(H)_{m+1}$ (II)

where: m is independently 0, 1, or 2; and each R is independently optionally substituted C$_{1-24}$ alkyl, optionally substituted C$_{2-24}$ alkenyl, optionally substituted C$_{2-24}$ alkynyl, optionally substituted C$_{6-12}$ aryl, C$_{3-12}$ heteroaryl, optionally substituted $C_{7-13}$ alkaryl, optionally substituted $C_{4-12}$ heteroalkaryl, optionally substituted $C_{7-13}$ aralkyl, optionally substituted $C_{4-12}$ heteroaralkyl, and, if substituted, the substituents are independently nitro, $C_1$-$C_{20}$ alkoxy, $C_5$-$C_{20}$ aryloxy, or halogen.

2. The solution composition of claim 1, wherein the base comprises potassium hydroxide, rubidium hydroxide, or cesium hydroxide.

3. The solution composition of claim 1, wherein the base comprises potassium hydroxide.

4. The solution composition of claim 1, wherein the base comprises a potassium alkoxide, a rubidium alkoxide, or a cesium alkoxide.

5. The solution composition of claim 1, wherein the base comprises a potassium alkoxide.

6. The solution composition of claim 1, wherein the base comprises a potassium tert-butoxide.

7. The solution composition of claim 1, wherein the base comprises a potassium amide.

8. The solution composition of claim 1, wherein the precursor hydrosilane is of the Formula (I) or Formula (II):

$(R)_{3-m}Si(H)_{m+1}$          (I)

$(R)_{3-m}(H)_mSi-Si(R)_{2-m}(H)_{m+1}$          (II)

where: m is independently 0, 1, or 2; and each R is independently $C_{1-24}$ alkyl, $C_{2-24}$ alkenyl, $C_{2-24}$ alkynyl, $C_{6-12}$ aryl, $C_{3-12}$ heteroaryl, $C_{7-13}$ alkaryl, $C_{4-12}$ heteroalkaryl, $C_{7-13}$ aralkyl, or $C_{4-12}$ heteroaralkyl.

9. The solution composition of claim 1, wherein the hydrosilane is $(R)_3SiH$ or $(R)_2SiH_2$, where R is independently at each occurrence $C_{1-6}$ alkyl, phenyl, tolyl, or pyridinyl.

10. The solution composition of claim 9, wherein the base comprises potassium tert-butoxide.

11. The solution composition of claim 1, wherein the solution composition contains less than 50 ppm of a transition metal catalyst.

12. The solution composition of claim 1, wherein the solution composition contains less than 10 ppm of a transition metal catalyst.

13. The solution composition of claim 1, wherein the species present in sufficient amount to exhibit an infrared absorption peak in the Si—H stretching region of an infrared spectrum comprises a Si—H—based species derived from the preconditioning of the mixture of:
(a) the precursor hydrosilane; and
(b) the base comprising potassium hydroxide, a potassium alkoxide, a potassium silanolate, rubidium hydroxide, a rubidium alkoxide, a rubidium silanolate, cesium hydroxide, a cesium alkoxide, a cesium silanolate, or a combination thereof; in
(c) the preconditioning solvent comprising one or more tetrahydrofurans, wherein the preconditioning solvent comprises 2-methyl-tetrahydrofuran;
wherein the solution composition is free of any added heteroaromatic, olefinic, or acetylenic substrates capable of C—H silylation, or of any alcohol substrates; and
wherein the Si—H—based species is present in the preconditioning solvent in sufficient amount to exhibit an absorption peak in the Si—H stretching region of an infrared spectrum that is of lower energy than a corresponding absorption peak of the precursor hydrosilane, when evaluated under comparable conditions.

14. The solution composition of claim 13, wherein the preconditioning solvent is 2-methyl-tetrahydrofuran.

15. The solution composition of claim 2, wherein the Si—H—based species derived from the preconditioning of the mixture comprises an optionally solvated silicon hydride structure of Formula (IV):

          (IV)

or a geometric isomer thereof, wherein
M$^+$ is a cation comprising potassium, rubidium, cesium, or a combination thereof;
—OR$^B$ is hydroxide, an alkoxide, an alkyl silanolate; or a combination thereof; and
—R$^S$ is H, —R, or Si(R)$_{3-m}$H$_m$, or a combination thereof wherein m is independently 0, 1, or 2; and each R is independently $C_{1-24}$ alkyl, $C_{2-24}$ alkenyl, $C_{2-24}$ alkynyl, $C_{6-12}$ aryl, $C_{3-12}$ heteroaryl, $C_{7-13}$ alkaryl, $C_{4-12}$ heteroalkaryl, $C_{7-13}$ aralkyl, or $C_{4-12}$ heteroaralkyl.

16. The solution composition of claim 13, wherein the solution composition contains less than 50 ppm of a transition metal catalyst.

17. The solution composition of claim 13, wherein the solution composition contains less than 10 ppm of a transition metal catalyst.

* * * * *